(12) United States Patent
Ochiai et al.

(10) Patent No.: US 10,477,846 B2
(45) Date of Patent: Nov. 19, 2019

(54) SPOOL FOR FISHING REEL

(71) Applicant: Shimano Inc., Sakai, Osaka (JP)

(72) Inventors: Koji Ochiai, Osaka (JP); Keigo Kitajima, Osaka (JP); Tsutomu Takada, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/169,253

(22) Filed: Oct. 24, 2018

(65) Prior Publication Data

US 2019/0183104 A1   Jun. 20, 2019

(30) Foreign Application Priority Data

Dec. 20, 2017   (JP) ................................. 2017-244393

(51) Int. Cl.
  *A01K 89/01*  (2006.01)
  *A01K 89/027*  (2006.01)

(52) U.S. Cl.
  CPC ......... *A01K 89/0111* (2013.01); *A01K 89/027* (2013.01)

(58) Field of Classification Search
  CPC .................................................. A01K 89/0111
  See application file for complete search history.

(56) References Cited

U.S. PATENT DOCUMENTS

| | | | | |
|---|---|---|---|---|
| 4,938,433 A * | 7/1990 | Toda | ..................... | A01K 89/029 242/245 |
| 5,855,328 A * | 1/1999 | Hitomi | ................. | A01K 89/029 242/245 |
| 5,947,400 A * | 9/1999 | Tsutsumi | ........... | A01K 89/0111 242/246 |
| 6,533,203 B2 * | 3/2003 | Hitomi | ............... | A01K 89/0111 242/322 |
| 8,485,461 B2 * | 7/2013 | Saito | .................. | A01K 89/0111 242/322 |
| 2001/0054661 A1 * | 12/2001 | Takikura | ............ | A01K 89/0111 242/322 |
| 2002/0053618 A1 * | 5/2002 | Ochiai | ............... | A01K 89/0111 242/323 |
| 2002/0170997 A1 * | 11/2002 | Furomoto | ............ | A01K 89/029 242/246 |

(Continued)

FOREIGN PATENT DOCUMENTS

JP      2004-147561 A      5/2004

*Primary Examiner* — Emmanuel M Marcelo

(74) *Attorney, Agent, or Firm* — Global IP Counselors, LLP

(57) ABSTRACT

A spool for a fishing reel attached to a reel body of the fishing reel includes a spool body, a spool ring, a fixing ring and a first regulating part. The spool body has a bobbin trunk, an annular flange extending from the bobbin trunk in a radially outward direction that intersects the spool axis, and a tubular connecting portion extending from the flange. The spool ring surrounds an outer peripheral edge of the flange, and is attached to the flange so as to be separable. The fixing ring is attached to the spool body via the tubular connecting portion so as to be separable and is configured to fix the spool ring against the flange from the front direction. The first regulating part regulates relative movement of the fixing ring with respect to the spool body and is detachably attached to the tubular connecting portion.

10 Claims, 14 Drawing Sheets

(56) References Cited

U.S. PATENT DOCUMENTS

| | | | |
|---|---|---|---|
| 2007/0075172 A1* | 4/2007 | Kitajima | A01K 89/0111 242/322 |
| 2009/0166460 A1* | 7/2009 | Kitajima | A01K 89/01931 242/322 |
| 2011/0180646 A1* | 7/2011 | Hiraoka | A01K 89/0111 242/241 |
| 2014/0175206 A1* | 6/2014 | Hiraoka | A01K 89/0111 242/234 |
| 2014/0231569 A1* | 8/2014 | Hui | A01K 89/0111 242/234 |
| 2015/0028143 A1* | 1/2015 | Hiraoka | A01K 89/0111 242/322 |

* cited by examiner

SPOOL FOR FISHING REEL

CROSS-REFERENCE TO RELATED APPLICATIONS

This application claims priority to Japanese Patent Application No. 2017-244393, filed on Dec. 20, 2017. The entire disclosure of Japanese Patent Application No. 2017-244393 is hereby incorporated herein by reference.

BACKGROUND

Field of the Invention

The present invention relates to spool for a fishing reel.

Background Art

In general, a spinning reel, which is the known type of fishing reel that casts (unreels) a fishing line forward, mainly comprises a reel body that has a handle, a rotor that is disposed on the front side of the reel body and that is rotatably combined with the reel body, and a spool that is disposed on the front side of the rotor and around which the fishing line is wound.

When the fishing line is wound, the spool is moved in reciprocating fashion in back and forth along a spool axis (back-forth direction) in conjunction with the rotor, which is rotated together with the rotation of the handle. It is thereby possible to wind the fishing line uniformly around a bobbin trunk via a line roller. When casting, the bail arm is put into a line-releasing position and the fishing rod is swung forward; thereby casting (unreeling) the fishing line that is wound around the bobbin trunk forward.

As described above, the spool is an important part around which the fishing line is wound, and the material and surface treatment thereof are continually being improved, with consideration given to durability, corrosion resistance, wear resistance, rigidity, winding comfort, and the like. In particular, a flange formed on the front side of the bobbin trunk tends to receive loads because the fishing line comes into contact therewith each time the fishing line is unreeled forward by when cast. Accordingly, in recent years, a spool having a spool ring formed of a hard material with excellent wear resistance, etc., is mounted on the outer peripheral edge portion side of the flange.

For example, Japanese Published Unexamined Application No. 2004-147561 discloses a spool in which the spool ring (hard material ring) formed from a hard material is firmly fixed (for example, fixed by means of friction-fitting, adhesion, caulking, or the like) on the outer peripheral edge of the flange. In relation to the spool mentioned above, the spool ring makes reduces the friction resistance that occurs between the spool and the fishing line, as well as, for example, prevents breakage of the fishing line and suppresses the reduction in the flight distance of the fishing line. Furthermore, the spool is configured so that the spool ring itself is less likely to be damaged or cause abrasion, etc., during contact with the fishing line.

SUMMARY

However, even with the conventional spool described above, there are cases in which problems, such as scratching, denting, and surface abrasion, of the spool ring occur due to, for example, contact with the outside and continual contact with the fishing line with long-term use. In this case, in the conventional spool the spool ring is firmly fixed to the flange, so the spool ring cannot be independently repaired or replaced, so that it is necessary to remove and repair, or replace, the entire spool. Consequently, maintenance costs for repairs and replacements tend to be high, and thus there is room for improvement.

The present invention was made in light of such circumstances, and an object thereof is to provide a spool for a fishing reel as well as a fishing reel with which it is possible to freely remove the spool ring.

Accordingly, a spool for a fishing reel according to the present invention is combined with a reel body of a fishing reel, which casts a fishing line forward and moves back and forth along a spool axis together with a rotation of a handle that is attached to the reel body. The spool comprises a spool body that has a bobbin trunk around which the fishing line is wound, an annular flange that extends from a front end portion of the bobbin trunk in a radially outward direction that intersects the spool axis, and a tubular connecting portion that extends forward from the flange, a spool ring that surrounds an outer peripheral edge of the flange from the radially outward direction, and is combined with the flange so as to be separable from the front, and a fixing ring that is combined with the spool body via the tubular connecting portion so as to be separable from the front and that fixes the spool ring against the flange from the front. A first regulating part regulates the relative movement of the fixing ring with respect to the spool body and is attached to the tubular connecting portion so as to be detachable with respect to the tubular connecting portion.

According to the spool of the present invention, the fixing ring fixes the spool ring against the flange of the spool body from the front, and the first regulating part regulates the relative movement of the fixing ring with respect to the spool body. It is thereby possible to combine the fixing ring with the spool body via the tubular connecting portion in a state in which the movement of the fixing ring in the axial direction of the spool shaft as well as in a circumferential direction revolving about the spool axis, is regulated. It is thus possible to stably press the spool ring against the flange from the front by utilizing the fixing ring and to sandwich the spool ring between the fixing ring and the flange. As a result, the spool ring can be held stably with little rattling, and, for example, the fishing line can be cast forward while the fishing line is stably guided by the spool ring during casting.

It should be noted that since the first regulating part is detachably attached to the tubular connecting portion, it is possible to cancel the regulation of the relative movement of the fixing ring with respect to the spool body by removing the first regulating part from the tubular connecting portion. As a result, it is possible to separate the fixing ring from the spool body toward the front to remove the fixing ring from the spool body and to thereby release the pressing of the spool ring by the fixing ring. Therefore, it is possible to separate the spool ring from the flange toward the front in order to remove the spool ring from the spool body.

In this manner, because it is possible to freely remove the spool ring, for example, when the spool ring is scratched, etc., it is possible to repair or replace only the spool ring. It is thus possible to keep maintenance costs for repairs and replacements down, which can lead to unburdening the user.

Furthermore, it is possible to select and replace an optimal spool ring from among, for example, a plurality of types of spool rings having different materials and surface treatments, in accordance with the type of fishing reel, the type of fishing line, the type of lure, etc. It is thus possible to selectively use the spool ring according to the situation in order to improve ease of use and reel performance, such as increasing the flight distance of the fishing line.

Additionally, a second regulating part that regulates the relative movement of the fixing ring with respect to the spool body in cooperation with the first regulating part can be formed on the fixing ring.

In this embodiment, by causing the first regulating part on the spool body side and the second regulating part on the fixing ring side to cooperate with each other, the relative movement of the fixing ring with respect to the spool body can be regulated. Thus, reliably regulating the relative movement of the fixing ring with respect to the spool body is simple compared to regulating the relative movement of the fixing ring with only the first regulating part.

In one embodiment, a first threaded portion can be formed in the tubular connecting portion, the fixing ring can have a tubular threaded portion in which a second threaded portion that engages the first threaded portion is formed, and is combined with the spool body by screwing the tubular threaded portion onto the tubular connecting portion, and the second regulating part can be configured to be capable of engaging the first regulating part from a circumferential direction about the spool axis to thereby regulate the movement of the fixing ring with respect to the spool body in the circumferential direction.

In this embodiment, it is possible to combine the fixing ring with respect to the spool body by screwing the fixing ring onto the spool body to thereby screw the tubular threaded portion to the tubular connecting portion. In particular, by screwing on the fixing ring, it is possible to gradually press the spool ring against the flange from the front while adjusting the pressing force with which the spool ring is pressed. Thus, stably sandwiching the spool ring between the flange and the fixing ring and stably holding the spool ring with less rattling is possible.

In addition, by attaching the first regulating part after combining the fixing ring with the spool body, the first regulating part and the second regulating part can be engaged in the circumferential direction. As a result, since it is possible to use the first regulating part and the second regulating part to regulate the movement of the fixing ring with respect to the spool body in the circumferential direction, for example, the fixing ring can be combined with the spool body to prevent the fixing ring from coming loose.

In one embodiment, a plurality of the first regulating parts and the second regulating parts can be disposed at intervals in the circumferential direction.

In this embodiment, because it is possible to use a plurality of the first regulating parts and the second regulating parts to regulate the movement of the fixing ring with respect to the spool body in the circumferential direction, for example, it is possible to prevent the fixing ring from coming loose.

In one embodiment, a screw hole that extends through the tubular connecting portion in the radial direction can be formed in the tubular connecting portion, and the first regulating part can be a screw member capable of being threaded into the screw hole.

In this embodiment, because the first regulating part can be threaded into the screw hole, it is possible to effectively prevent the first regulating part from unintentionally detaching from (falling off) the tubular connecting portion. It is thereby possible, for example, to stably maintain the regulation of the relative movement of the fixing ring with respect to the spool body over a long period of time.

When using a set screw, for example, as the screw member, it is possible to insert the first regulating part inside the screw hole such that the first regulating part does not protrude into the tubular connecting portion. It is thus possible to effectively utilize the inner space of the tubular connecting portion.

In one embodiment, a marker that indicates the relative circumferential position of the second regulating part with respect to the first regulating part can be formed on the fixing ring.

In this embodiment, when the fixing ring is threaded onto the spool body, it is possible to adjust the circumferential position of the fixing ring with respect to the spool body while visually checking the marker. As a result, when the first regulating part is attached to the tubular connecting portion, it is possible to promptly bring the first regulating part and the second regulating part into potential engagement with each other in the circumferential direction. It is thus possible to efficiently attach the spool ring.

It is possible to further provide an anti-rotation portion that suppresses the movement of the spool ring in the circumferential direction about the spool axis relative to the flange.

In this embodiment, the movement of the spool ring in the circumferential direction relative to the flange can be suppressed by the anti-rotation portion, so the spool ring can be sandwiched between the fixing ring and the flange while preventing the spool ring from rotating. It is thus possible to more stably hold the spool ring.

Furthermore, when attaching the fixing ring to the spool body by fastening the fixing ring thereto, the spool ring can be prevented from rotating together with the fixing ring, so it is a simple matter to appropriately tighten the fixing ring.

In one embodiment, the anti-rotation portion may include a first recess formed on the flange and that opens toward the front as well as in the radially outward direction, a second recess that opens toward the front as well as in the radially inward direction and is disposed facing the first recess in the radial direction, and an anti-rotation pin detachably fitted inside the first recess and the second recess from the front.

In this embodiment, it is possible to combine the spool ring with the flange and then to suppress the relative movement of the spool ring with respect to the flange in the circumferential direction by simple operation of fitting the anti-rotation pin inside the first recess and the second recess from the front. It is thus possible to efficiently attach the spool ring.

The fixing ring may press against the anti-rotation pin from the front.

In this embodiment, the fixing ring presses both the anti-rotation pin and the spool ring against the flange from the front. It is thus possible to effectively prevent the anti-rotation pin from becoming detached.

In one embodiment, a fishing reel according to the present invention comprises a reel body having a handle, the spool for the fishing reel, and a rotor that is combined with the reel body so as to be rotatable about the spool axis together with the rotation of the handle, and that winds the fishing line around the bobbin trunk by means of rotation in conjunction with the back-and-forth movement of the spool.

According to the fishing reel of the present invention, the spool ring can be removed independently of the entire spool without removal of the spool. Thus, as described above, it is possible to repair or replace only the spool ring and to replace the spool ring to selectively use the spool ring according to the situation. Therefore, maintenance costs can be kept down, and it is possible to provide a fishing reel that is easy to use and that exhibits improved reel performance.

According to the fishing reel of the present invention, since it is possible to freely remove the spool ring and to repair or replace only the spool ring, it is possible to keep the maintenance costs required for repair and replacement down. Furthermore, because it is possible to replace the spool ring and selectively use the spool ring according to the situation, it is possible to improve ease of use as well as to improve reel performance, such as increasing the flight distance of the fishing line.

DETAILED DESCRIPTION OF THE EMBODIMENTS

Embodiment 1

A first embodiment of a spool and a fishing reel according to the present invention will be described below with reference to the drawings. In the present embodiment, a spinning reel is described as an example of a fishing reel. Additionally, in each of the drawings, there are instances in which the scale of each component member has been appropriately changed as required to improve the visibility of the component member.

Figure 1:
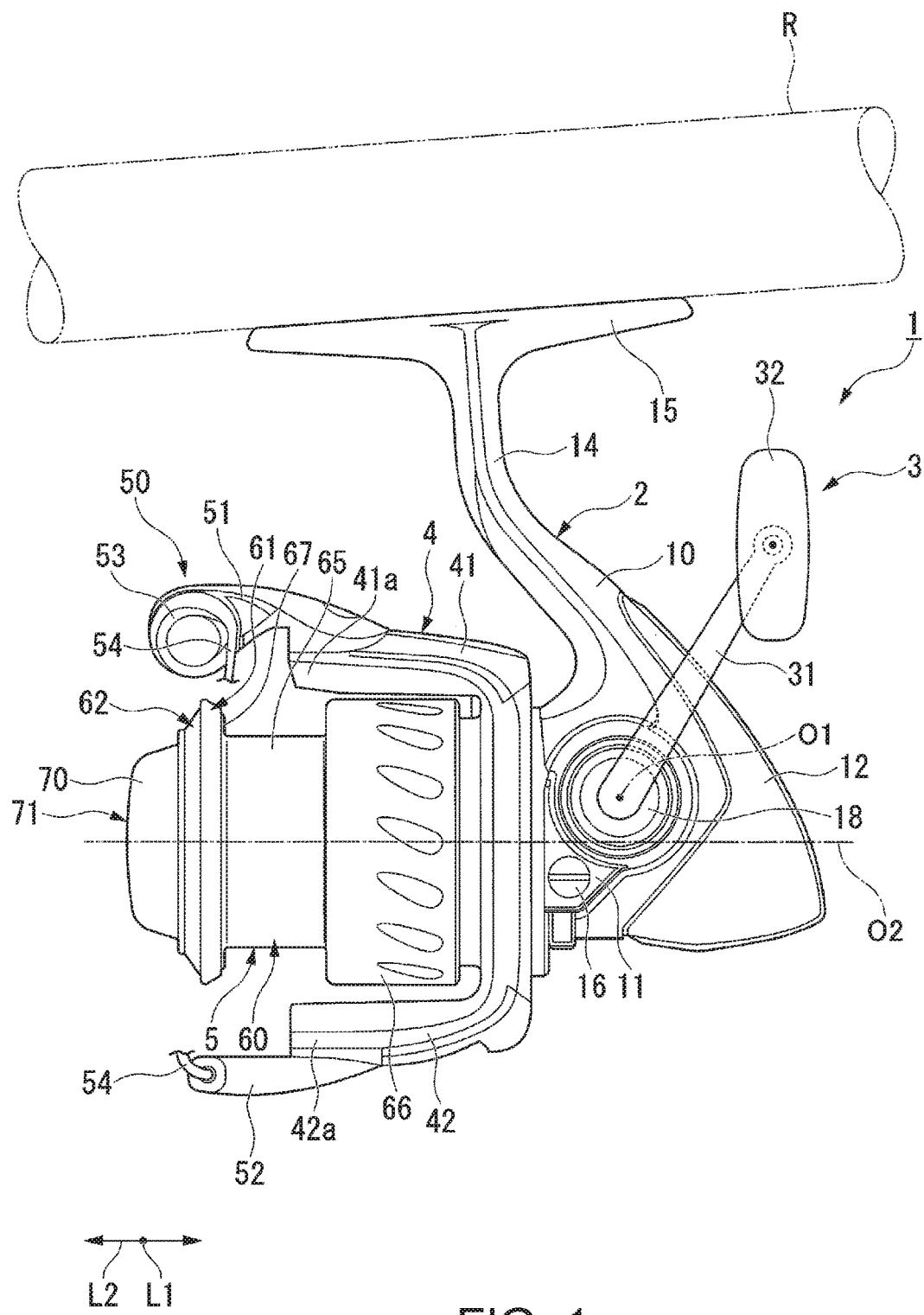
FIG. 1 is a side view of a spinning reel (fishing reel) in a first embodiment of the present invention.
Figure 2:
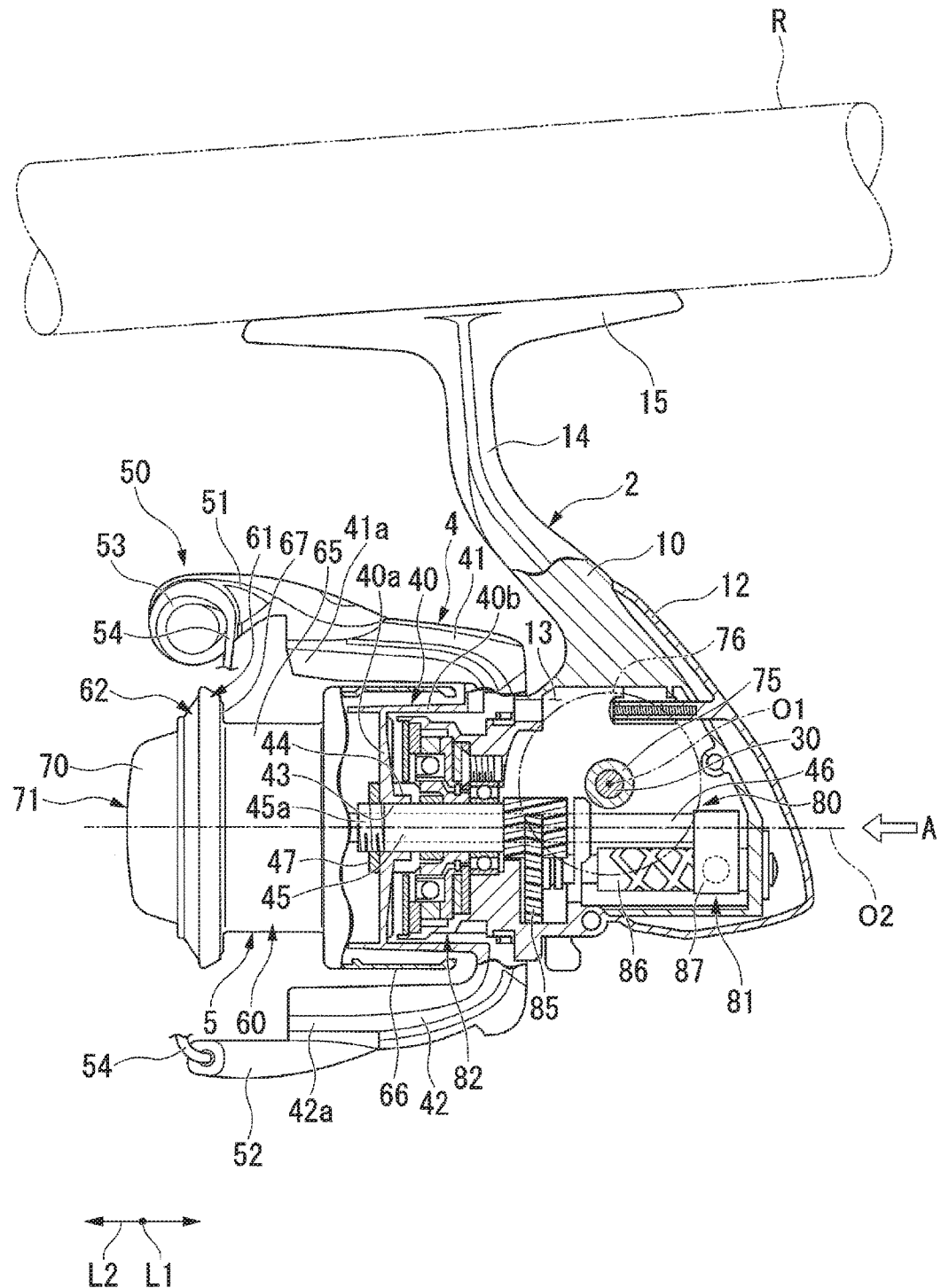
FIG. 2 is a side view including a partial cross section of the spinning reel shown in FIG. 1.
Figure 3:
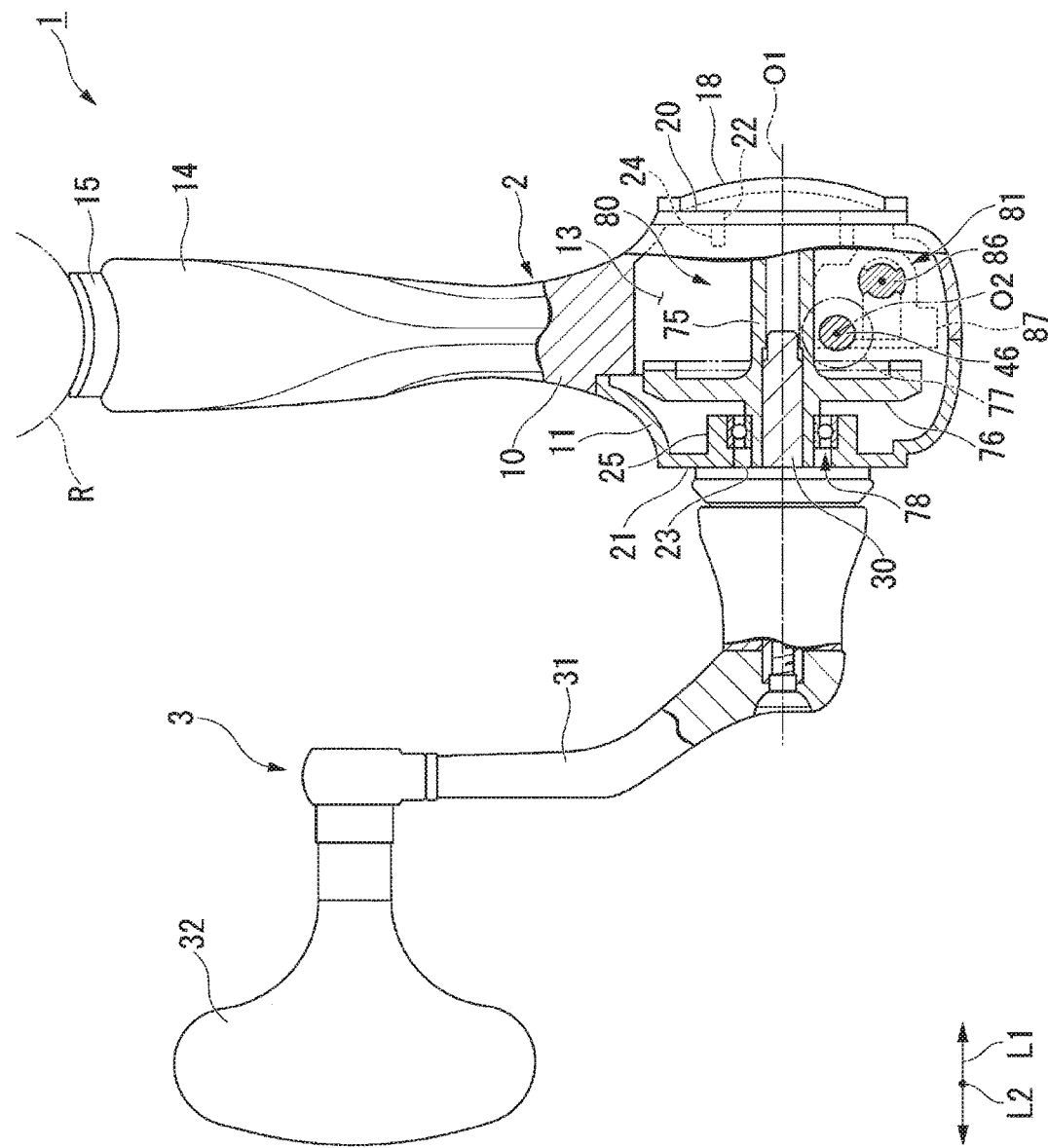
FIG. 3 is a rear view including a partial cross section of the spinning reel when the spinning reel shown in FIG. 2 is viewed from the arrow A direction (rear side).

As shown in FIGS. 1-3, the spinning reel 1 of the present embodiment mainly comprises a reel body 2, a handle assembly (handle) 3 that is attached to the reel body 2 so as to be rotatable about a handle axis O1, a rotor 4 that is combined with the reel body 2 so as to be rotatable about a spool axis O2, and a spool 5 that is combined with the reel body 2 so as to be capable of moving along the spool axis O2 in reciprocating fashion, and around which is wound a fishing line, which is not shown.

In the present embodiment, the direction along the handle axis O1 is defined as the left-right direction L1 and the direction along the spool axis O2 is defined as the back-forth direction L2. Additionally, the direction in which the fishing line is cast (unreeled) from the spool 5 in the back-forth direction L2 is defined as the front or a front direction, the opposite direction thereto is defined as the rear or rear direction, and left and right (i.e., left and right direction) are defined according to a rear view of the spinning reel 1 as seen from the rear. FIG. 3 is a rear view when viewing the spinning reel 1 from the rear side (arrow A direction shown in FIG. 2).

Furthermore, the direction that intersects the handle axis O1 in a plan view of the first axis O1 as seen from the axial direction thereto (left-right direction L1) may be referred to as the radial direction, and the direction encircling the first axis O1 may be referred to as the circumferential direction. Similarly, the direction that intersects the spool axis O2 in a plan view of the spool axis O2 as seen from the axial direction thereto (back-forth direction L2) may be referred to as the radial direction, and the direction encircling the spool axis O2 may be referred to as the circumferential direction. Furthermore, in the radial direction of the handle axis O1, the direction from the first axis O1 to a fishing rod R is referred to as upward, and the opposite direction is referred to as downward.

The handle axis O1 and the spool axis O2 are disposed vertically spaced apart from each other, as well as intersecting each other so as to be essentially perpendicular when viewed from the vertical direction. In other words, the handle axis O1 and the spool axis O2 intersect each other three-dimensionally.

Reel Body

The reel body 2 comprises a body portion 10, a lid part 11, and a guard member 12. The body portion 10 can be a molded piece made of a high-strength resin or a light alloy such as a magnesium alloy or an aluminum alloy, and a housing space 13 for housing various reel component members is formed therein. A leg portion 14 is integrally formed on the upper portion of the body portion 10 so as to extend upwardly. A mounting piece 15 for mounting the fishing rod R is formed at the upper end portion of the leg portion 14 so as to extend along the fishing rod R.

The fishing rod R shown in FIGS. 1 to 3 is illustrated schematically, and illustrations of configurations such as that of a reel attaching pedestal (reel seat), which are generally provided on a fishing rod R, have been omitted.

The lid part 11 is a molded piece made of a high-strength resin or a light alloy similar to the body portion 10 and is detachably fixed to the body portion 10. The above-described housing space 13 is closed by the lid part 11 so as to be, for example, tight (liquid-tight, airtight, etc.). The method of fixing the lid part 11 to the body portion 10 is not particularly limited, and can entail the utilization of a plurality of fixing bolts, for example, including a fixing bolt 16 that is disposed in a portion of the body portion 10 that is positioned on the rear side of the rotor 4.

The guard member 12 is a cover part that covers the rear portion of the body portion 10 and the rear portion of the lid part 11 from the rear side. However, the guard member 12 is not a necessary component, and thus need not be provided.

As shown in FIG. 3, a flat first mounting wall 20 for mounting the handle assembly 3 or a cap 18 is formed on the right-hand side surface of the body portion 10. A corresponding flat second mounting wall 21 for mounting the handle assembly 3 or the cap 18 is formed on the left-hand side surface of the lid part 11. In the illustrated example, the cap 18 is mounted on the first mounting wall 20 side, and the handle assembly 3 is mounted on the second mounting wall 21 side.

That is, the spinning reel of the present embodiment is an example of a left-handle spinning reel 1. However, as described further below, it is possible to switch the spinning reel to a right-handle spinning reel by mounting the handle assembly 3 on the side of the first mounting wall 20. In this case, the cap 18 is mounted on the second mounting wall 21 side.

A first mounting hole 22 is formed in the first mounting wall 20 to extend through the body portion 10 in the left-right direction L1. Similarly, a second mounting hole 23 is formed in the second mounting wall 21 to extend through the lid part 11 in the left-right direction L1. The first mounting hole 22 and the second mounting hole 23 are formed coaxially with the handle axis O1 and are disposed opposing each other in the left-right direction L1 across the housing space 13.

A cylindrical first supporting tube 24 that projects toward the inside of the of housing space 13, and the inner side of which communicates with the inside of the first mounting hole 22, is formed on the first mounting wall 20. Similarly, a cylindrical second supporting tube 25 that projects toward the inside of the of housing space 13, and the inner side of which communicates with the inside of the second mounting hole 23, is formed on the second mounting wall 21. The first supporting tube 24 and the second supporting tube 25 are arranged coaxially with the handle axis O1.

Handle Assembly

As shown in FIG. 3, the handle assembly 3 comprises a handle shaft 30 that is supported so as to be rotatable about the handle axis O1 with respect to the reel body 2, a handle arm 31 that is non-rotatably connected to the handle shaft 30 and that is attached so as to be rotatable about the handle axis O1 with respect to the reel body 2 via the handle shaft 30, and a handle knob 32 that is rotatably attached to the distal end portion of the handle arm 31.

Rotor

As shown in FIGS. 1 and 2, the rotor 4 is combined so as to be rotatable about the spool axis O2 with the rotation of the handle assembly 3, and winds the fishing line around a bobbin trunk 65 of the spool 5, which is described further below, by rotating in conjunction with the reciprocal movement (longitudinal movement along the spool axis O2) of the spool 5.

The rotor 4 is disposed on the front side of the reel body 2 coaxially with the spool axis O2 and comprises a cylindrical body 40 in the form of a cylinder with a top, a front wall portion 40a and a peripheral wall portion 40b; and a first arm portion 41 and a second arm portion 42 that are connected to the peripheral wall portion 40b.

The cylindrical body 40 is open at the rear and is combined with the reel body 2 from the front side so as to surround the front portion side of the reel body 2 from the outside in the radial direction. A cylindrical boss portion 44, in which a through-hole 43 is formed that extends through the front wall portion 40a in the back-forth direction L2, is formed in the central portion of the front wall portion 40a so as to project rearward. The through-hole 43 is formed coaxially with the spool axis O2. A cylindrical pinion shaft 45 and a spool shaft 46 are inserted through the through-hole 43 into the interior of the boss portion 44.

The pinion shaft 45 is rotatable about the spool axis O2, and the front-end portion thereof extends farther forward than the front wall portion 40a. The front wall portion 40a is integrally connected to the pinion shaft 45 with a nut 47 that is attached to the front-end portion of the pinion shaft 45. The rotor 4 is thereby combined with or attached to the reel body 2 so as to be rotatable about the spool axis O2.

The first arm portion 41 and the second arm portion 42 are connected to the rear-end portion of the peripheral wall portion 40b and are disposed to oppose each other in the radial direction across the spool axis O2. The first arm portion 41 and the second arm portion 42 are formed to extend forward from the rear-end portion of the peripheral wall portion 40b, and the front-end portions 41a, 42a thereof project farther forward than the front wall portion 40a.

A bail arm 50 is rotatably (pivotably) attached to the front-end portion 41a of the first arm portion 41 and the front-end portion 42a of the second arm portion 42.

The bail arm 50 includes a first bail support member 51 rotatably attached to the front-end portion 41a of the first arm portion 41, a second bail support member 52 rotatably attached to the front-end portion 42a of the second arm portion 42, a line roller 53 rotatably attached to the front-end portion of the first bail support member 51, and a bail 54 that is curved essentially in the form of a U shape and disposed so as to connect the space between the first bail support member 51 and the second bail support member 52.

One end portion of the bail 54 is fixed to the front-end portion of the first bail support member 51 via the line roller 53, and the other end portion thereof is fixed to the front-end portion of the second bail support member 52. The line roller 53 guides the fishing line to the spool 5.

The bail arm 50 is configured to be pivotable between a line-guiding position (the state or position shown in FIGS. 1 and 2) for guiding the fishing line to the line roller 53, and a line-releasing position, which is the reverse of the line-guiding position. It is possible to wind the fishing line around the spool 5 via the line roller 53 by the rotor 4 rotating about the spool axis O2 when the bail arm 50 is positioned in the line-guiding position.

Spool

Figure 4:
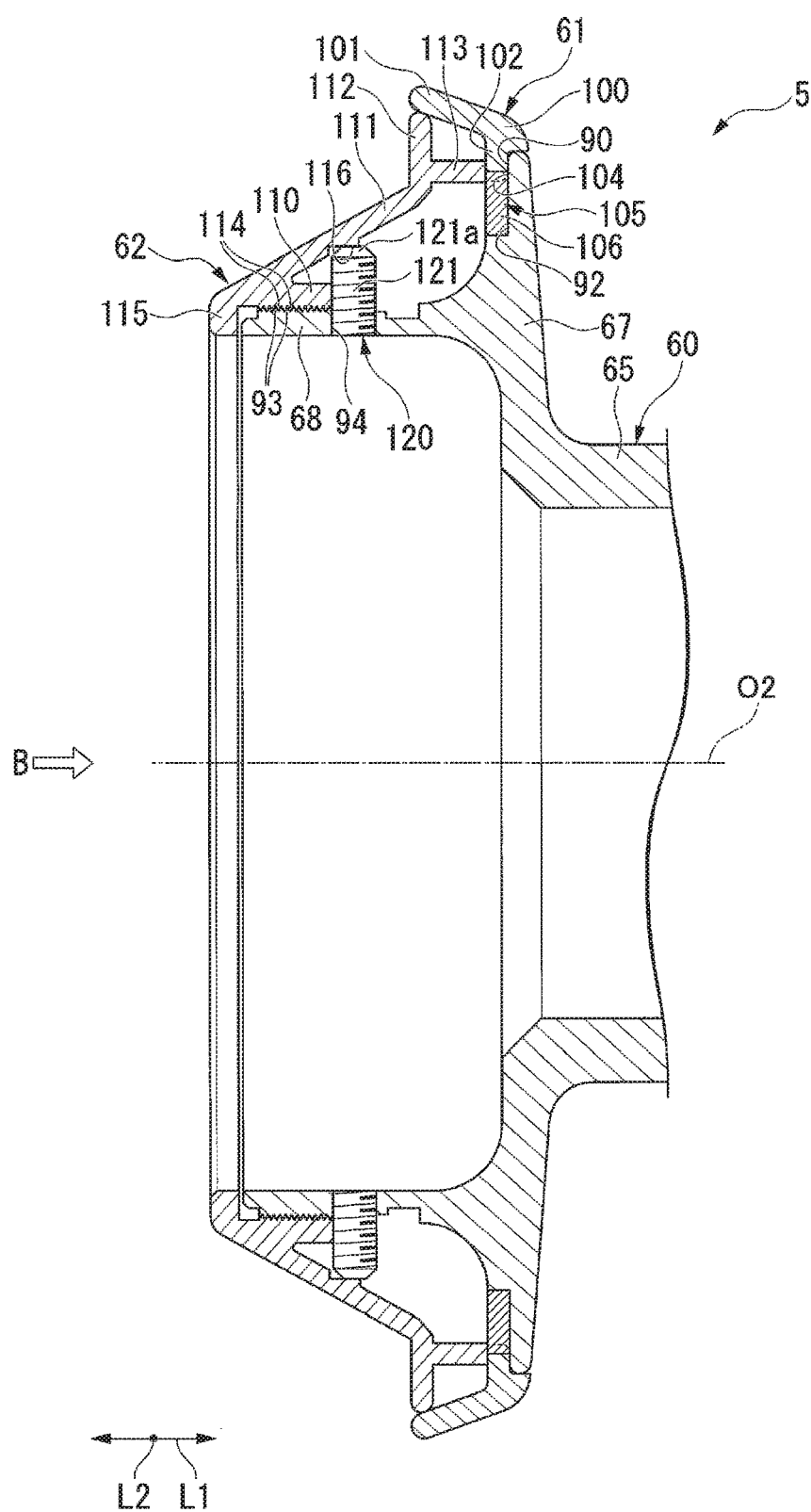
FIG. 4 is a cross-sectional view of a spool with the periphery of the spool ring shown in FIG. 1 enlarged.
Figure 5:
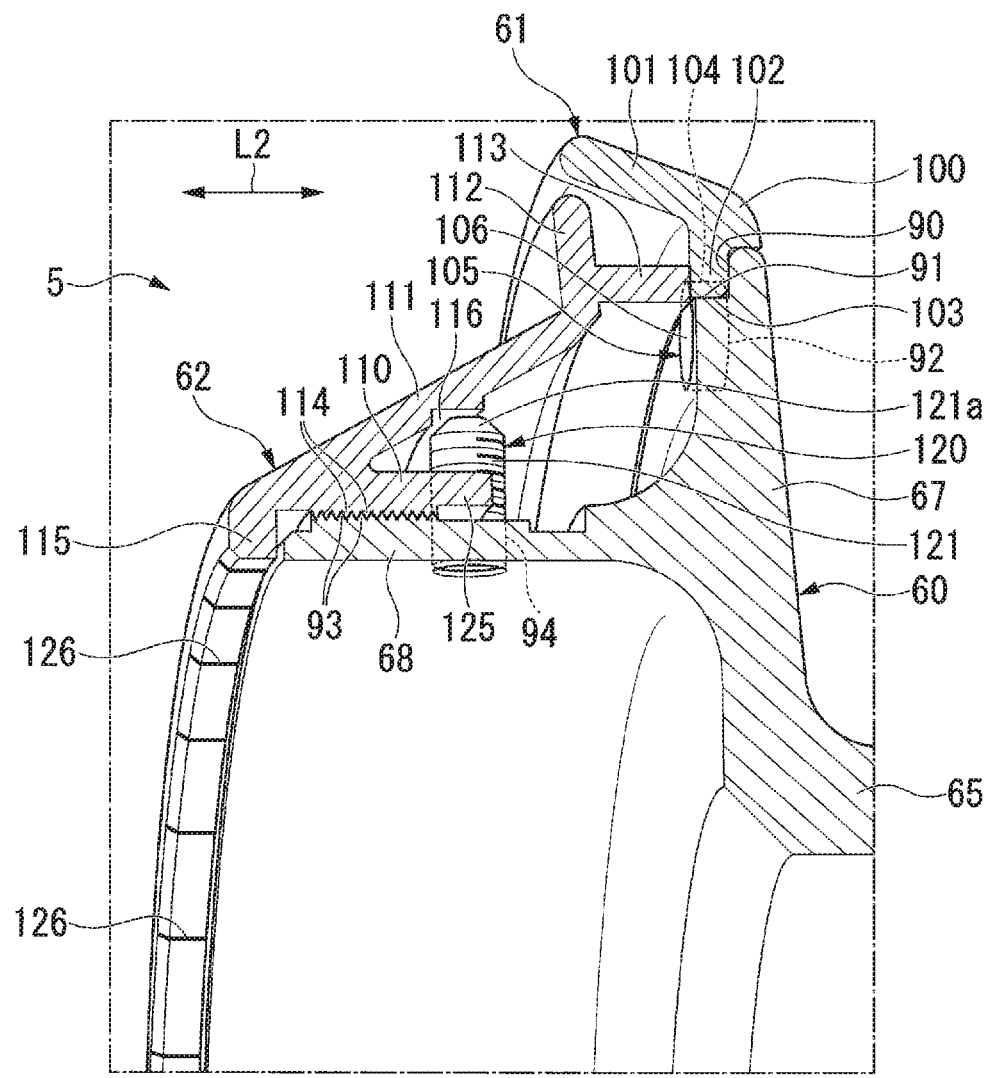
FIG. 5 is a perspective view (including a cross-sectional view) of the spool shown in FIG. 4.

As shown in FIGS. 2, 4, and 5, the spool 5 comprises a tubular spool body 60 that is detachably fixed to the front-end portion of a spool shaft 46, a spool ring 61 that is separably combined with or attached to the spool body 60 from the front, and an annular ring collar (fixing ring) 62 that presses the spool ring 61 against the spool body 60 from the front.

The spool shaft 46 is disposed coaxially with the spool axis O2 and is configured to move in a reciprocating fashion along the spool axis O2 by an oscillation mechanism 81, described further below. The spool 5 is thereby configured to move in reciprocating fashion along the spool axis O2 (longitudinally movable) with respect to the reel body 2 via the spool shaft 46.

The spool body 60 comprises the cylindrical bobbin trunk 65 disposed so as to be positioned between the first bail support member 51 and the second bail support member 52, a cylindrical skirt portion 66 that is formed to have a larger diameter than the bobbin trunk 65 extending rearward from the rear-end portion of the bobbin trunk 65 and to surround the peripheral wall portion 40*b* of the cylindrical body 40 of the rotor 4 from the outside in the radial direction, a flange 67 that extends in the radially outward direction from the front-end portion of the bobbin trunk 65, and a tubular connecting portion 68 that extends farther forward from the flange 67 and disposed to be coaxial with the spool axis O2.

The configuration of the spool 5 will be described further below in detail.

As shown in FIG. 2, a drag adjustment device 71 and a drag adjustment knob 70 are attached to the spool. The drag adjustment device 71 mainly comprises a braking mechanism, (not shown) is disposed on the inner side of the bobbin trunk 65 and brakes the rotation of the spool 5. The drag adjustment knob 70 is attached so as to be rotatable about the spool axis O2 and adjusts the braking force of the braking mechanism. The drag adjustment knob 70 is mainly disposed inside the tubular connecting portion 68. In each figure besides FIGS. 1 and 2, depiction of the drag adjustment device 71 has been omitted.

Other Configurations of the Spinning Reel

As shown in FIGS. 2 and 3, a cylindrical drive shaft 75, a drive gear 76, a pinion gear 77 and a shaft bearing 78 are disposed within the housing space 13 of the reel body 2. The cylindrical drive shaft 75 is supported by the reel body 2 so as to be rotatable about the handle axis O1 and is connected to the handle assembly 3 by the handle shaft 30. The drive gear 76 is formed on the drive shaft 75, and the pinion gear 77 meshes with the drive gear 76 and rotates about the spool axis O2 with the rotation of the drive shaft 75. The shaft bearing 78 is disposed between the drive gear 76 and the reel body 2 and supports the drive shaft 75 so as to be rotatable about the handle axis O1.

Furthermore, a rotor drive mechanism 80 that rotates the rotor 4 about the spool axis O2 with the rotation of the handle assembly 3, an oscillation mechanism 81 that moves the spool 5 in reciprocating fashion in the direction of the spool axis O2 with the rotation of the handle assembly 3, and an anti-reverse rotation mechanism 82 of the rotor 4 are also provided within the housing space 13 of the reel body 2.

Rotor Drive Mechanism

The rotor drive mechanism 80 mainly includes the drive shaft 75, the drive gear 76, and the pinion gear 77.

As shown in FIG. 3, the handle shaft 30 is inserted into the interior of the drive shaft 75 from the left side and is connected in a rotationally fixed manner to the drive shaft 75. The drive shaft 75 is thereby rotated about the handle axis O1 as the handle assembly 3 is rotated. The drive gear 76 is formed, for example, integrally with the drive shaft 75.

As shown in FIG. 2, the pinion gear 77 is integrally formed with the cylindrical pinion shaft 45 that is disposed coaxially with the spool axis O2. The pinion shaft 45 is inserted from the rear into the through-hole 43 formed in the boss portion 44 of the rotor 4, and the front-end portion 45*a* thereof projects farther forward than the front wall portion 40*a* of the rotor 4. The nut 47 is attached to the front-end portion 45*a* of the pinion shaft 45, thereby integrally connecting the pinion shaft 45 and the rotor 4. The spool shaft 46 is inserted on the inner side of the pinion shaft 45 so as to be relatively movable in the direction of the spool axis O2.

The pinion gear 77 meshes with the drive gear 76 and rotates about the spool axis O2 with the rotation of the drive shaft 75 and the drive gear 76. It is thereby possible to rotate the rotor 4 about the spool axis O2 via the pinion gear 77 and the pinion shaft 45. Therefore, the rotor drive mechanism 80 transmits the rotational force that is generated by the rotation of the handle assembly 3 to the rotor 4.

Oscillation Mechanism

As shown in FIG. 2, the oscillation mechanism 81 comprises an intermediate gear 85 that meshes with the pinion gear 77, a threaded shaft 86 disposed parallel to the spool shaft 46, and a slider 87 that moves back and forth along the threaded shaft 86 with the rotation of the threaded shaft 86.

The intermediate gear 85 and the threaded shaft 86 thereby rotate with the rotation of the pinion gear 77. The slider 87 is connected to the spool shaft 46 in a rotationally fixed manner and moves back and forth along the threaded shaft 86 with the rotation of the threaded shaft 86. It is thereby possible to cause the spool shaft 46 that is fixed to the slider 87 to move back and forth along the spool axis O2. Thus, the oscillation mechanism 81 converts the rotational force that is generated by the rotation of the handle assembly 3 into a linear motive force and transmits the motive force to the spool 5.

Detailed Configuration of the Spool

The configuration of the spool 5 will now be described in detail.

As shown in FIGS. 4 and 5, the flange 67 of the spool body 60 extends in the radially outward direction from the front-end portion of the bobbin trunk 65, and the outer diameter thereof is essentially the same as the outer diameter of the skirt portion 66.

An annular groove 90 that is recessed rearward and extends in the circumferential direction over the entire circumference of the flange 67 is formed on the front surface of the flange 67. The annular groove 90 opens forward as well as outwardly in the radial direction. Of the wall surfaces that define the annular groove 90, the wall surface that faces outward in the radial direction is defined as a first circumferential surface 91.

Figure 6:
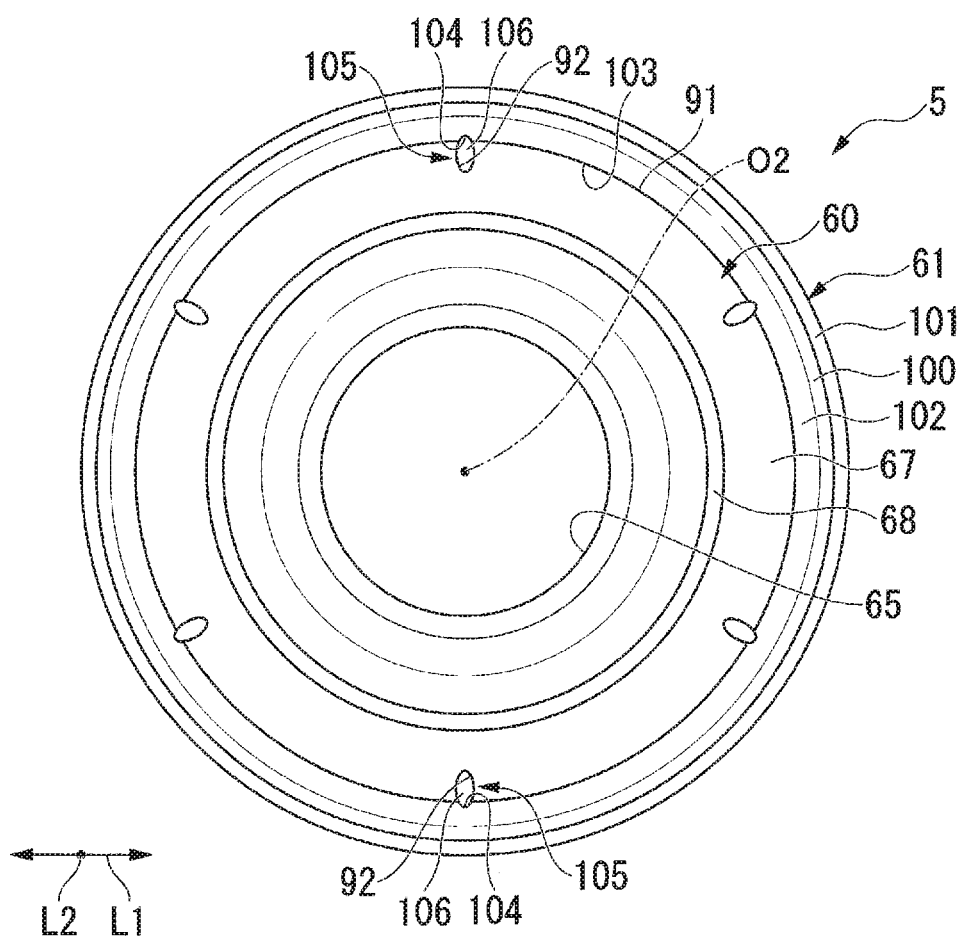
FIG. 6 is a front view of the spool when the spool shown in FIG. 4 is viewed from the arrow B direction (front side). However, the illustration of a collar ring has been omitted.

As shown in FIGS. 4 to 6, a first recess 92 that is recessed rearward is also formed on the front surface of the flange 67.

The first recess 92 is formed in a portion of the flange 67 that is farther inside than the annular groove 90 in the radial direction and opens forward as well as outwardly in the radial direction. Accordingly, the first recess 92 opens onto the first circumferential surface 91.

The first recess 92 has an elongated elliptical shape in the radial direction in cooperation with a second recess 104, described further below, in a front view (i.e., as seen from the front), and the depth thereof is configured to be equivalent to the depth of the annular groove 90. In addition, a plurality of first recesses 92 is formed at intervals in the circumferential direction. For example, six first recesses 92 are formed and disposed at equal intervals in the circumferential direction about the spool axis O2.

However, the shape and number of the first recesses 92 are not limited to the number described above and can be appropriately changed. For example, the number of the first recesses 92 may be one or a number greater than one other than six. In addition, the shape of the first recess 92 can be circular or have a polygonal shape in cooperation with the second recess 104, described further below, in a front view (i.e., as seen from the front).

As shown in FIGS. 4 and 5, a first threaded portion 93 (for example, a female threaded portion) is formed on the outer circumferential surface of the tubular connecting portion 68. The first threaded portion 93 is mainly formed in a portion of the tubular connecting portion 68 that is positioned farther forward than the central portion in the back-forth direction L2. However, the first threaded portion 93 can also be formed over the entire length of the tubular connecting portion 68.

A screw hole 94 extending through the tubular connecting portion 68 in the radial direction is formed in the tubular connecting portion 68. A plurality of the screw holes 94 are formed on a portion of the tubular connecting portion 68 that is positioned farther rearward than the first threaded portion 93 at intervals in the circumferential direction. For example, four screw holes 94 are formed so as to be disposed at equal intervals in the circumferential direction about the spool axis O2.

However, the number of screw holes 94 is not limited to the number described above and can be, for example, three or less or five or more. A female threaded portion, which is not shown, is formed on the inner circumferential surface of the screw hole 94. The spool body 60 having the flange 67 and the tubular connecting portion 68, configured as described above, is formed from a light alloy such as magnesium alloy, an aluminum alloy, etc., a high-strength resin, a carbon material, or the like.

Spool Ring

As shown in FIGS. 4 and 5, the spool ring 61 surrounds the outer peripheral edge portion of the flange 67 from the outside in the radial direction and is separably combined with or attached to the flange 67 from the front.

The spool ring 61 is formed from a hard material, such as a hard ceramic, and has a designated coating treatment (hard surface treatment, etc.) applied thereto. As a result, for example, certain degrees of hardness, durability, wear resistance, and so forth are ensured for the spool ring 61. However, the material of the spool ring 61 is not limited to a hard material, and the spool ring may be made of metal, such as a titanium alloy, an aluminum alloy, or the like.

As shown in FIGS. 4 to 6, the spool ring 61 comprises a ring body 100 surrounding the outer peripheral edge portion of the flange 67 from the outside in the radial direction and fitted to the outer peripheral edge portion, and a guide ring 101 that gradually extends in the radially outward direction from the outer peripheral edge portion of the ring body 100 toward the front, and is disposed coaxially with the spool axis O2.

A connecting piece 102, projecting in the radially inward direction and entering the annular groove 90 formed on the flange 67, is formed on the ring body 100.

The connecting piece 102 is detachably inserted into the annular groove 90 from the front and is detachably fitted to the outer side of the first circumferential surface 91 in a state of contact with the front surface of the flange 67. As a result, the entire spool ring 61 is detachably combined with or attached to the flange 67 from the front.

Figure 7:
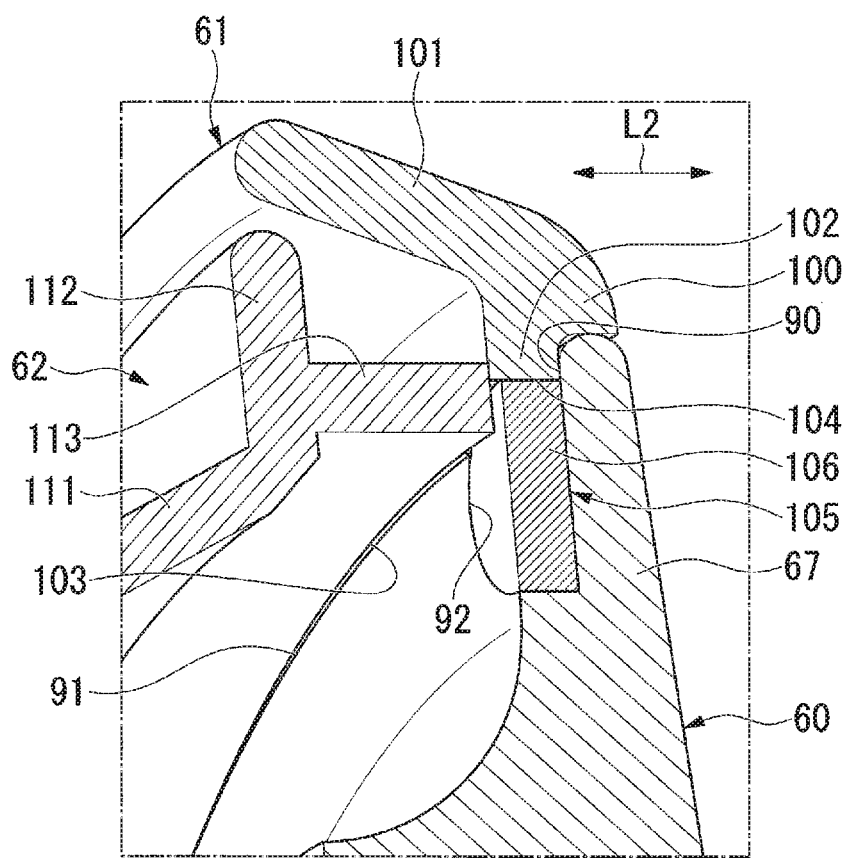
FIG. 7 is a perspective view (including a cross-sectional view) of the spool with the periphery of an anti-rotation pin shown in FIG. 5 enlarged.
Figure 8:
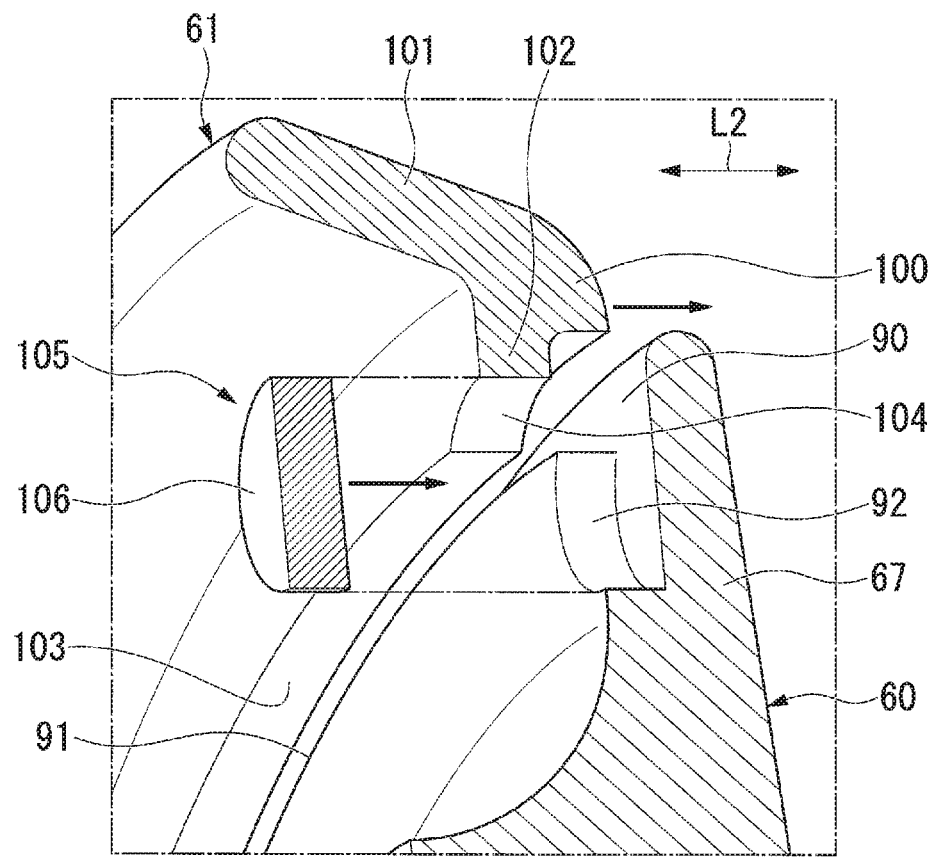
FIG. 8 is a perspective view (including a cross-sectional view) of the spool showing the state before the spool ring is combined with a spool body shown in FIG. 7.

As shown in FIGS. 7 and 8, an inner end surface of the connecting piece 102 forms a second circumferential surface 103 that is, for example, in close contact with the first circumferential surface 91 over the entire circumference thereof. Thus, a seal is ensured between the first circumferential surface 91 and the second circumferential surface 103.

The second recess 104 extends through the connecting piece 102 in the back-forth direction L2 and is formed on the connecting piece 102. The second recess 104 is formed in a portion of the connecting piece 102 opposing the first recess 92, which is formed on the flange 67, in the radial direction, and opens inwardly in the radial direction. Accordingly, the second recess 104 opens onto the second circumferential surface 103 and communicates with the interior of the first recess 92.

Since the second recess 104 extends through the connecting piece 102 in the back-forth direction L2, the second recess is open both in the front and the rear. However, it is not necessary for the second recess 104 to extend through the connecting piece 102 in the back-forth direction L2; it is sufficient if the second recess opens at least forwardly and inwardly in the radial direction.

As shown in FIG. 6, the second recess 104 has an elongated elliptical shape in the radial direction in cooperation with the first recess 92 in a front view (i.e., as seen from the front). In addition, a plurality of second recesses 104 is formed at intervals in the circumferential direction, corresponding to the first recesses 92. That is, six second recesses 104 are formed at equal intervals in the circumferential direction about the spool axis O2.

As shown in FIG. 4, since the guide ring 101 gradually extends in the radially outward direction from the outer peripheral edge portion of the ring body 100 toward the front, as described above, the guide ring 101 has a tapered shape in cross section that gradually expands in diameter toward the front. The outer circumferential surface of the guide ring 101 is a guide surface that ensures a predetermined degree of smoothness by, for example, a surface treatment, and is capable of guiding the fishing line that is cast from the bobbin trunk 65 with little resistance.

The front-end portion of the guide ring 101 is positioned farther rearward than the screw hole 94 and a screw member 120, described further below.

Anti-Rotation Portion

The spool ring 61, configured as described above, is combined with or attached to the flange 67 of the spool body 60 so that relative movement in the circumferential direction is suppressed by the anti-rotation portion 105.

Figure 9:
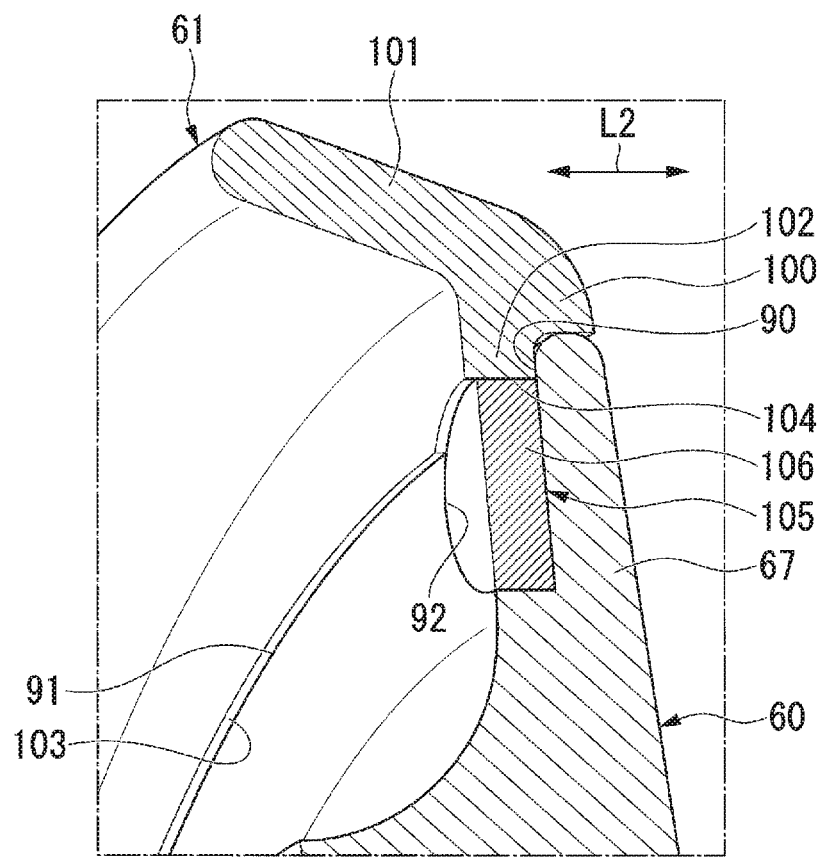
FIG. 9 is a perspective view (including a cross-sectional view) of the spool, showing the state in which the anti-rotation pin is fitted inside a first recess and a second recess, after the spool ring has been combined with the spool body from the state shown in FIG. 8.

As shown in FIGS. 6, 7, and 9, the anti-rotation portion 105 includes the first recess 92 formed on the flange 67 of the spool body 60, the second recess 104 formed on the connecting piece 102 of the spool ring 61, and the anti-rotation pin 106 that detachably fits into the first recess 92 and the second recess 104 from the front.

The anti-rotation pin 106 is a thin button with an elliptical shape in a front view (i.e., as seen from the front), corresponding to the shapes of the first recess 92 and the second recess 104.

As shown in FIGS. 8 and 9, the anti-rotation pin 106 is individually fitted inside each of the plurality of first recesses 92 and second recesses 104 from the front, after the spool ring 61 has been combined with or attached to the flange 67 of the spool body 60 from the front.

As a result, the anti-rotation pin 106 integrally connects the spool body 60 and the spool ring 61 in the circumferential direction when the first circumferential surface 91 and the second circumferential surface 103 are adjacent in the radial direction. As a result, the spool ring 61 is combined with or attached to the spool body 60 such that the relative movement with respect to the flange 67 in the circumferential direction is suppressed by a plurality of the anti-rotation pins 106.

Ring Collar

As shown in FIGS. 4 and 5, the ring collar 62 is screwed onto the tubular connecting portion 68 to thereby be combined with or attached to the spool body 60 from the front via the tubular connecting portion 68, and presses the spool ring 61 against the flange 67 of the spool body 2 from the front.

Figure 10:
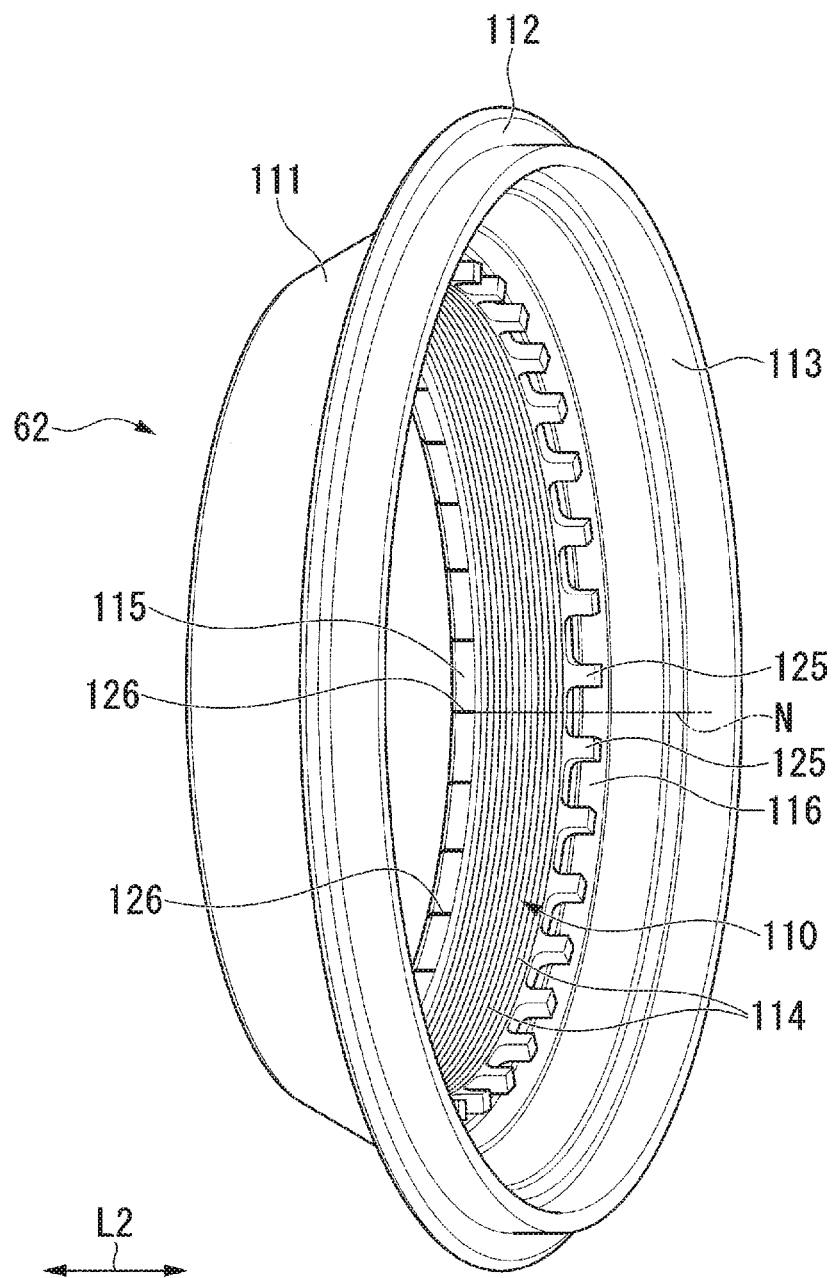
FIG. 10 is a perspective view of the collar ring shown in FIG. 1.

As shown in FIGS. 4, 5, and 10, the ring collar 62 comprises a tubular threaded portion 110, an outer shell tube portion 111, an annular support wall portion 112, and a pressing piece 113. The tubular threaded portion 110 surrounds the tubular connecting portion 68 of the reel body 2 from the outside in the radial direction. The outer shell tube portion 111 gradually extends rearward from the front-end portion side of the tubular threaded portion 110 toward the radially outward direction and surrounds the tubular connecting portion 68 from the outside in the radial direction. The annular support wall portion 112 extending from the rear-end portion of the outer shell tube portion 111 toward the radially outward direction and contacts the front-end portion of the guide ring 101 in the spool ring 61 from the inside in the radial direction. The a pressing piece 113 extending from the support wall portion 112 rearward and presses the connecting piece 102 of the spool ring 61 against the flange 67 of the spool body 60, and is disposed coaxially with the spool axis O2.

A second threaded portion 114 (for example, a male threaded portion) that screws onto the first threaded portion 93, which is formed on the outer circumferential surface of the tubular connecting portion 68, is formed on the inner circumferential surface of the tubular threaded portion 110. An annular flange 115 that projects inward in the radial direction and that extends in the circumferential direction over the entire circumference of the tubular threaded portion 110 is formed on the front-end portion of the tubular threaded portion 110.

The flange 115 is positioned farther forward than the front-end portion of the tubular connecting portion 68, and the inner diameter thereof is essentially the same as the inner diameter of the tubular connecting portion 68. Accordingly, over-tightening of the ring collar 62 with respect to the spool body 60 by the flange 115 can be prevented.

As described above, because the outer shell tube portion 111 gradually extends rearward from the front-end portion side of the tubular threaded portion 110 toward the radially outward direction, the outer shell tube portion has a tapered shape in cross section that gradually expands in diameter toward the rear. The rear-end portion of the outer shell tube portion 111 is positioned farther inside in the radial direction than the front-end portion of the guide ring 101 and the annular groove 90 of the flange 67.

The pressing piece 113 is formed with a cylindrical shape that surrounds the rear-end portion side of the tubular connecting portion 68 from the outside in the radial direction and presses the connecting piece 102 against the flange 67 of the spool body 60 over the entire circumference from the front by screwing (fastening) the tubular threaded portion 110 onto the tubular connecting portion 68.

However, the shape of the pressing piece 113 is not limited to that of a cylinder. For example, the pressing piece 113 can be formed in an arc shape that extends in the circumferential direction, with a plurality of such pressing pieces 113 formed at intervals in the circumferential direction. Even in this embodiment, it is possible to press the connecting piece 102 against the flange 67 of the spool body 60 from the front at a plurality of locations by using a plurality of the pressing pieces 113.

In addition, for example, the outer shell tube portion 111 may be formed such that the rear-end portion of the outer shell tube portion 111 is positioned farther outside in the radial direction than the annular groove 90 of the flange 67, with the pressing piece 113 then formed to extend from the rear-end portion of the outer shell tube portion 111 rearward.

The pressing piece 113 not only presses the connecting piece 102 against the flange 67 of the spool body 60 from the front, but, as shown in FIGS. 4 and 7, also presses the anti-rotation pin 106 that is fitted into the first recess 92 and the second recess 104 from the front. As a result, the anti-rotation pin 106 is prevented from detaching from (falling out of) the interior of the first recess 92 and the second recess 104 by the pressing piece 113.

As shown in FIGS. 4 and 5, the support wall portion 112 contacts the front-end portion of the guide ring 101 from the inside in the radial direction and supports the guide ring 101 from the inside in the radial direction. Thus, for example, when an external force acts on the guide ring 101, it is possible to prevent the guide ring 101 from being displaced so as to fall inwardly in the radial direction by using the support wall portion 112. It is thereby possible to stably guide fishing line by using the guide ring 101.

As shown in FIGS. 5 and 10, a stopper surface 116, with which a distal end portion 121a of the screw member 120, described further below, contacts, is formed on the inner circumferential surface of the outer shell tube portion 111.

The stopper surface 116 is formed in a portion of the inner circumferential surface of the outer shell tube portion 111 positioned on the outside in the radial direction of the screw hole 94 that is formed on the tubular connecting portion 68, and is formed with an annular shape that extends in the circumferential direction over the entire circumference of the outer shell tube portion 111. The stopper surface 116 is formed essentially parallel to the spool axis O2.

First Regulating Portion, Second Regulating Portion

As shown in FIGS. 4 and 5, the ring collar 62, formed as described above, is restricted from moving relative to the spool body 60 in the circumferential direction by cooperation between a plurality of screw members (first regulating portions) 120 that are attached to the tubular connecting portion 68 and a plurality of locking projections (second regulating portions) 125 that are formed on the ring collar 62.

The screw member 120 is detachably attached to the tubular connecting portion 68 by being threaded into a screw hole 94 formed on the tubular connecting portion 68.

In the present embodiment, a set screw, the male threaded portion of which is screwed into the female threaded portion of the screw hole 94, is formed on the outer circumferential surface of a screw shaft 121, and the head portion of which has the same diameter as the screw shaft 121, i.e., an imo screw, serves as the screw member 120. In the illustrated example, the screw member 120 is a so-called "flat tip" screw, in which the distal end portion (screw tip) 121a of the screw shaft 121 is formed flat, but the shape of the distal end portion 121a is not particularly limited in this way. In addition, an attachment hole, which is not shown, for rotating the screw member 120 by engaging a tool therewith, is formed on the end surface of the head portion side of the screw shaft 121. Examples of attachment holes include hex, phillips, slotted, torx sockets and so forth, but no particular limitation is imposed thereby.

The screw member 120 is attached to slide into the interior of the screw hole 94, and the distal end portion 121a thereof contacts the stopper surface 116 of the ring collar 62 from the inside in the radial direction. As result, the screw member 120 is restricted from being further screwed into the screw hole 94. The head portion side of the screw member 120 does not protrude into the tubular connecting portion 68 and is housed within the screw hole 94.

The locking projections 125 project farther rearward from the rear-end portion of the tubular threaded portion 110 of the ring collar 62, and a plurality thereof are disposed at intervals in the circumferential direction. Specifically, the locking projections 125 are arranged to be aligned in the circumferential direction at intervals that are slightly larger than the diameter of the screw shaft 121 of the screw member 120. Thus, when the screw member 120 is disposed between locking projections 125 that are adjacent to each other in the circumferential direction, the distal end portion 121*a* thereof contacts the stopper surface 116.

Of the plurality of locking projections 125, two locking projections 125 that are side by side in the circumferential direction with the screw member 120 sandwiched therebetween are capable of being engaged by the screw member 120 from the circumferential direction. Thus, the locking projections 125 regulate the relative movement of the ring collar 62 with respect to the spool body 60 in the circumferential direction.

Specifically, if the direction of rotation when the ring collar 62 is tightened onto the tubular connecting portion 68 is defined as one direction (i.e., a first direction) in the circumferential direction, and, conversely, the direction of rotation when the ring collar 62 is loosened with respect to the tubular connecting portion 68 is defined as the other direction (i.e., a second direction) in the circumferential direction, for example, when the ring collar 62 is rotated in the one (first) direction in the circumferential direction, which is the tightening direction, the locking projection 125, positioned farther in the other (second) direction in the circumferential direction than the screw member 120, is engaged with the screw member 120. As a result, relative movement of the ring collar 62 with respect to the spool body 60 in the tightening direction can be regulated.

In addition, for example, when the ring collar 62 is rotated in the other (second) direction in the circumferential direction, which is the loosening direction, the locking projection 125, positioned farther in the one (first) direction in the circumferential direction than the screw member 120, is engaged with the screw member 120. As a result, the movement of the ring collar 62 relative to the spool body 60 in the loosening direction can be regulated.

As described above, it is possible to regulate the relative movement of the ring collar 62 with respect to the spool body 60 in the circumferential direction by using the screw member 120 and the plurality of the locking projections 125.

The number of the plurality of the locking projections 125 that are formed is greater than the number corresponding to the screw holes 94 and the screw members 120. It is thus possible to select the locking projection 125 that is to engage with the screw member 120 according to the relative circumferential position of the ring collar 62 with respect to the spool body 60.

A mark groove (marker) 126 that indicates the relative circumferential position of the locking projection 125 with respect to the screw member 120 can be formed on the flange 115 of the ring collar 62. Thus, it can be possible to ascertain the relative circumferential position of the locking projection 125 with respect to the screw member 120 by using the mark groove 126.

The mark groove 126 is formed linearly along the spool axis O2 on the inner circumferential surface of the flange 115, and a plurality thereof are formed at intervals in the circumferential direction. As shown in FIG. 10, each mark groove 126 is formed so that the circumferential position thereof coincides with a virtual extension line N that extends along the spool axis O2 between the locking projections 125 that are adjacent to each other in the circumferential direction.

Thus, as shown in FIG. 5, it is possible to position the screw hole 94 between the locking projections 125 that are adjacent to each other in the circumferential direction by combining the ring collar 62 with the spool body 60 such that the center of the screw hole 94 and the mark groove 126 coincide in the direction of the spool axis O2 (back-forth direction L2).

Action of the Spinning Reel

Next, a case in which the spinning reel 1 with the above-described configuration is used will be briefly described.

During casting, the bail arm 50 is opened from the state shown in FIGS. 1 and 2 and brought into a casting position, and the fishing rod R is swung forward. The fishing line that is wound around the bobbin trunk 65 of the spool 5 can thereby be unreeled forward.

Thereafter, when the fishing line is wound, the bail arm 50 is returned to the line-guiding position, as shown in FIGS. 1 and 2. The fishing line is thereby guided to the line roller 53 by the bail arm 50. In this state, a handle operation is carried out by appropriate rotation of the handle assembly 3 about the handle axis O1 while the handle knob 32 is grasped.

Since the rotational force of the handle assembly 3 is transmitted to the rotor 4 by the rotor drive mechanism 80, it is possible to rotate the rotor 4 about the spool axis O2. At the same time, since the rotational force of the handle assembly 3 is transmitted to the spool 5 by the oscillation mechanism 81, it is possible for the spool 5 to move in reciprocating fashion along the spool axis O2.

As a result, it is possible to rotate the rotor 4 while the spool 5 moves in reciprocating fashion in the back-forth direction L2 and to uniformly wind the fishing line onto the bobbin trunk 65 of the spool 5 via the line roller 53.

In particular, according to the spool 5 of the present embodiment, as shown in FIGS. 4 and 5, the ring collar 62 presses the spool ring 61 against the flange 67 of the spool body 60 from the front, and the relative movement of the ring collar 62 with respect to the spool body 60 in the circumferential direction is regulated by the cooperation between the screw member 120 and the locking projection 125. It is thus possible to combine the ring collar 62 with the spool body 60 via the tubular connecting portion 68 when the movement of the ring collar 62 in the circumferential direction is regulated.

Thus, the spool ring 61 can be stably pressed against the flange 67 from the front by utilizing the ring collar 62 and to sandwich the spool ring 61 between the ring collar 62 and the flange 67. As a result, the spool ring 61 can be stably held with little rattling, and, for example, the fishing line can be cast in a forward direction while stably guiding the fishing line with the guide ring 101 of the spool ring 61 at the time of casting.

Moreover, since the screw member 120 is detachably attached to the tubular connecting portion 68, regulation of the relative movement of the ring collar 62 with respect to the spool body 60 in the circumferential direction can be canceled by removing the screw member 120 from the screw hole 94 of the tubular connecting portion 68. As a result, it is possible to separate the ring collar 62 from the spool body 60 toward the front to remove the ring collar 62 from the spool body 60, and to thereby release the pressing of the spool ring 61 by the ring collar 62. Therefore, it is possible to separate the spool ring 61 from the flange 67 toward the front to remove the spool ring 61 from the spool body 60.

Specifically, when the spool ring 61 is removed, the drag adjustment member 70, etc., is removed from the inside of the tubular connecting portion 68, after which the screw members 120 are respectively removed from each screw hole 94 formed on the tubular connecting portion 68. As a result, it is possible to release the engagement in the circumferential direction of the locking projection 125 with respect to the screw member 120.

Next, after removal of the screw members 120, the ring collar 62 is rotated in the other (second) direction in the circumferential direction, which is the loosening direction, with respect to the spool body 60 to separate the ring collar 62 from the spool body 60, and to thereby remove the ring collar 62 forward.

Next, after removal of the ring collar 62, it is possible to remove the spool ring 61 from the spool body 60 toward the front by removing the anti-rotation pin 106 from inside the first recess 92 and the second recess 104.

In this manner, because it is possible to freely remove the spool ring 61, for example, if the spool ring 61 becomes scratched, etc., it is possible to repair or replace only the spool ring 61. It is thus possible to keep maintenance costs for repairs and replacements down, which can unburden the user.

Furthermore, it is possible to select and replace an optimum spool ring 61 from among, for example, a plurality of types of spool rings 61 having different materials and surface treatments, in accordance with the type of the spinning reel 1, the type of the fishing line, the type of lure, and the like. It is thus possible to selectively use the spool ring 61 according to the situation, which improves ease of use and reel performance, for example by increasing the flight distance of the fishing line.

As described above, since the spinning reel 1 according to the present embodiment comprises the spool 5 from which the spool ring 61 can be freely removed independently, it is possible to repair or replace only the spool ring 61, and to replace the spool ring 61 to selectively use the spool ring 61 according to the situation. Thus, maintenance costs can be kept down, and it is possible to provide a spinning reel 1 that is easy to use and has improved reel performance.

Next, an embodiment in which the spool ring 61 is attached will be described.

In this embodiment, the spool ring 61 is assembled onto the spool ring 61 from the front, and, as shown in FIG. 8, the ring body 100 fits to the outer peripheral edge portion of the flange 67 while the connecting piece 102 of the spool ring 61 fits into the annular groove 90, which is formed on the flange 67. Thus, the spool ring 61 can be combined with or attached to the flange 67 from the front.

At this time, the spool ring 61 is combined with or attached to the flange 67 such that the positions of the plurality of the first recesses 92 disposed on the flange 67 and the positions of the plurality of the second recesses 104 disposed on the connecting piece 102 coincide in the circumferential direction. As a result, the plurality of the first recesses 92 and the second recesses 104 will be mutually linked to each other.

Next, the anti-rotation pins 106 are fitted into each of the plurality of the first recesses 92 and the second recesses 104 from the front. As a result, as shown in FIG. 9, the relative movement of the spool ring 61 with respect to the flange 67 in the circumferential direction by the anti-rotation pins 106 can be suppressed.

Next, the ring collar 62 is screwed onto the spool body 60 in the one (first) direction in the circumferential direction that is the tightening direction to screw the tubular threaded portion 110 onto the tubular connecting portion 68. As a result, it is possible to combine the ring collar 62 with the spool body 60 from the front, and, as shown in FIG. 7, to press the connecting piece 102 of the spool ring 61 against the flange 67 from the front by utilizing the pressing piece 113.

Specifically, by tightening the ring collar 62, it is possible to gradually press the connecting piece 102 against the flange 67 from the front while adjusting the pressing force with which the spool ring 61 is pressed. Thus, the spool ring 61 can be stably sandwiched between the flange 67 and the pressing piece 113 and the spool ring 61 can be stably held with less rattling.

Furthermore, because the relative movement of the spool ring 61 in the circumferential direction with respect to the flange 67 is suppressed by the anti-rotation pins 106, the spool ring 61 can be sandwiched between the pressing piece 113 and the flange 67 while preventing the spool ring 61 from rotating. Thus, the spool ring 61 can be stably held with even less rattling. Furthermore, since the spool ring 61 does not rotate together with the rotation of the ring collar 62 when the ring collar 62 is tightened, the tightening of the ring collar 62 can be carried out easily and reliably.

Moreover, the pressing piece 113 of the ring collar 62 presses against the anti-rotation pins 106, as shown in FIG. 7, as well as pressing the spool ring 61 against the flange 67 from the front. It is thus possible to effectively prevent the detachment of the anti-rotation pin 106 from inside the first recess 92 and the second recess 104.

Next, the screw member 120 is attached to the screw hole 94.

Upon attachment of the screw member 120, when the above-described ring collar 62 is tightened, the circumferential position of the ring collar 62 with respect to the spool body 60 is adjusted while the mark groove 126 that is formed on the flange 115 is visually checked. Specifically, as shown in FIG. 5, the circumferential position of the ring collar 62 with respect to the spool body 60 is adjusted so that the position of the mark groove 126 coincides, in the circumferential direction, with the position of the screw hole 94 that is formed on the tubular connecting portion 68.

Thereafter, using a tool that is not shown, the screw member 120 is threaded into the screw hole 94 from inside the tubular connecting portion 68, and, as shown in FIGS. 4 and 5, the distal end portion 121*a* of the screw member 120 is brought into contact with the stopper surface 116 of the ring collar 62. As a result, the screw member 120 can be attached to the tubular connecting portion 68 with the screw member 120 inserted in the screw hole 94 so that the screw member 120 does not protrude inside the tubular connecting portion 68.

As described above, since the circumferential position of the ring collar 62 with respect to the spool body 60 is adjusted while the mark groove 126 is visually confirmed, by attaching the screw member 120 to the screw hole 94, the screw member 120 can be disposed between the locking projections 125 that are adjacent to each other in the circumferential direction to bring the screw member 120 and the locking projections 125 into engagement with each other in the circumferential direction.

As a result, the movement of the ring collar 60 relative to the spool body 62 in the circumferential direction can be regulated by using the screw member 120 and the locking projections 125. Thus, the ring collar 62 can be combined with or attached to the spool body 60 such that, for example, the ring collar 62 is prevented from coming loose.

Specifically, since a plurality of the screw members 120 are utilized, the screw members 120 and the locking projections 125 can be engaged in the circumferential direction in a plurality of locations, and the movement of the ring collar 62 relative to the spool body 60 in the circumferential direction can be effectively suppressed to thereby appropriately prevent the ring collar 62 from coming loose.

With the procedure described above, it is possible to complete the attachment of the spool ring 61.

Specifically, since the circumferential position of the ring collar 62 with respect to the spool body 60 can be adjusted while the mark groove 126 is visually confirmed when the spool ring 61 is attached, when the screw member 120 is attached to the tubular connecting portion 68, the locking projection 125 does not block the screw hole 94, and it is possible to appropriately and promptly bring the screw member 120 and the locking projections 125 into engagement with each other in the circumferential direction. It is thus possible to efficiently attach the spool ring 61.

In addition, it is possible to combine the spool ring 61 with the flange 67 and then to suppress the relative movement of the spool ring 61 with respect to the flange 67 in the circumferential direction by a simple operation of fitting the anti-rotation pin 106 into the first recess 92 and the second recess 104 from the front. It is thus possible to efficiently attach the spool ring 61 in this way as well.

Furthermore, because the screw member 120 is threaded into the screw hole 94, it is possible to effectively suppress the screw member 120 from unintentionally detaching from (falling off) the tubular connecting portion 68. Thus, regulation of the relative movement in the circumferential direction of the ring collar 62 can be stably maintained with respect to the spool body 60 over a long period of time.

Furthermore, since a set screw is used as the screw member 120, it is possible to attach the screw member 120 to the tubular connecting portion 68 when inserted in the screw hole 94 such that a portion of the screw member 120 does not protrude into the tubular connecting portion 68. It is thus possible to effectively utilize the inner space of the tubular connecting portion 68, and, for example, to appropriately dispose the drag adjustment knob 70, etc., as shown in FIG. 2.

Modified Example of the First Embodiment

In the above-described first embodiment, the anti-rotation pin 106 can be formed from an elastic material that can be elastically deformed. Although not particularly limited, examples of the elastic material include nitrile rubber, butyl rubber, silicone rubber, and elastomer resin.

When the anti-rotation pin 106 is formed from an elastic material, for example, the anti-rotation pin 106 is slightly larger than the outer sizes of the first recess 92 and the second recess 104, and the anti-rotation pin 106 fits into the first recess 92 and the second recess 104 in an elastically deformed state. As a result, g the anti-rotation pin 106 can be brought into good contact with the inner surfaces of the first recess 92 and the second recess 104 by utilizing the elastic restorative force of the anti-rotation pin 106.

It is thus possible to prevent rattling between the anti-rotation pin 106 and the first recess 92 as well as the second recess 104 and to prevent the spool ring 61 from moving slightly in the circumferential direction with respect to the spool body 60 by an amount commensurate to the rattling. Thus, the relative movement of the spool ring 61 with respect to the spool body 60 in the circumferential direction can be more effectively suppressed, which leads to the spool ring 61 being more stably held.

Figure 11:
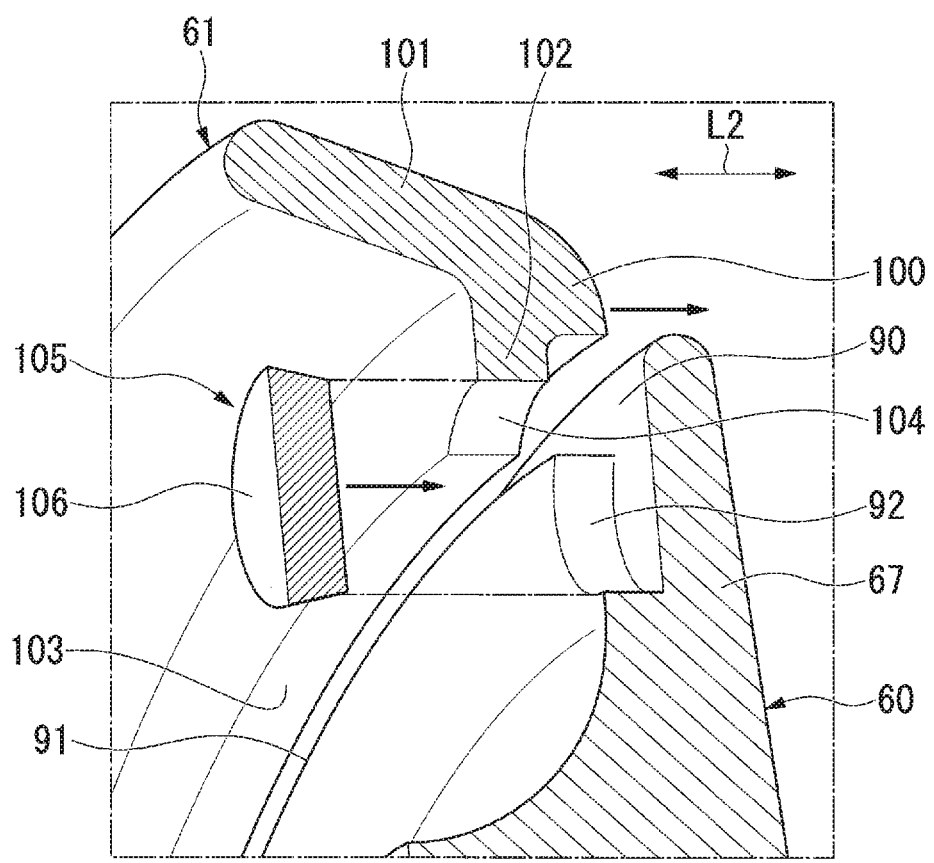
FIG. 11 is a view showing a modified example of the anti-rotation pin according to the first embodiment and is a perspective view (including a cross-sectional view) of the spool showing the state before the spool ring has been combined with the spool body.
Figure 12:
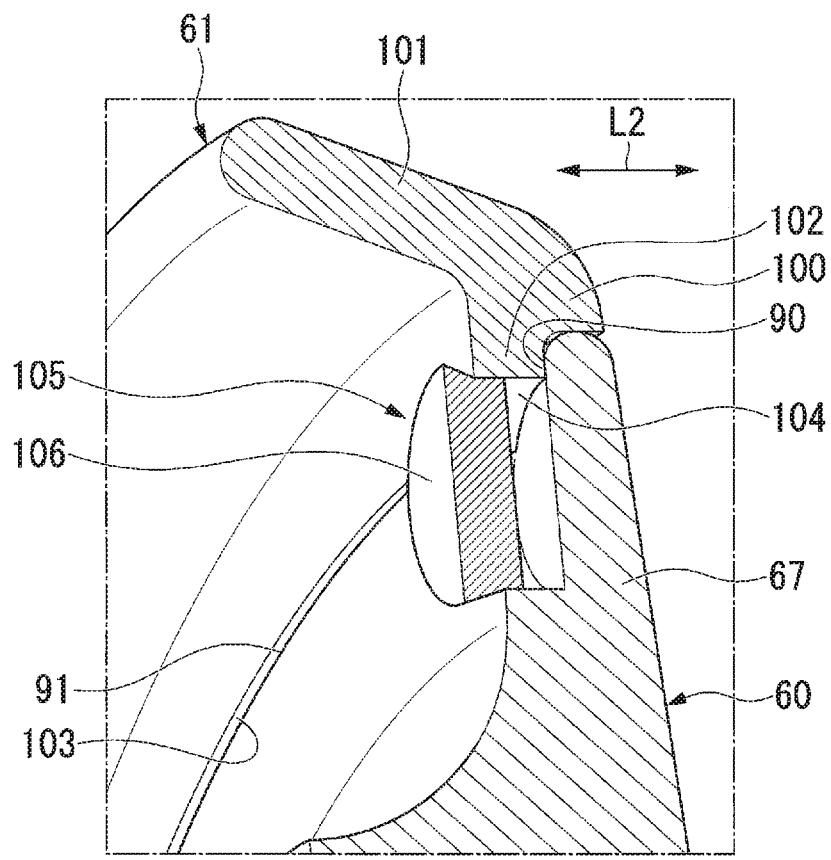
FIG. 12 is a perspective view (including a cross-sectional view) of the spool showing the state in which the anti-rotation pin is fitted inside the first recess and the second recess, after the spool ring has been combined with the spool body from the state shown in FIG. 11.

Furthermore, when the anti-rotation pin 106 is formed from an elastic material, the anti-rotation pin 106 can be formed to have a tapered shape in cross section such that the outer diameter gradually increases from the back toward the front, as shown in FIGS. 11 and 12.

In this embodiment, when the anti-rotation pin 106 is fitted into the first recess 92 and the second recess 104, it is possible to elastically deform the anti-rotation pin 106 gradually such that the amount of elastic deformation increases as the fitting progresses. Accordingly, it is easier to fit the anti-rotation pin 106 into the first recess 92 and the second recess 104. In addition, after the anti-rotation pin 106 is fitted into the first recess 92 and the second recess 104, the same action and effects as described above can be achieved.

Embodiment 2

Next, a second embodiment of the spool and the fishing reel according to the present invention will be described with reference to the drawings. In this second embodiment, the portions that are the same as compositional elements of the first embodiment have been assigned the same reference symbols, and their descriptions have been omitted.

In the first embodiment, the anti-rotation portion 105 is formed by the first recess 92, the second recess 104, and the anti-rotation pin 106 to suppress the relative movement of the spool ring 61 with respect to the spool body 60 in the circumferential direction, but in the present embodiment, an O-ring is used to suppress the relative movement of the spool ring 61 with respect to the spool body 60 in the circumferential direction.

Figure 13:
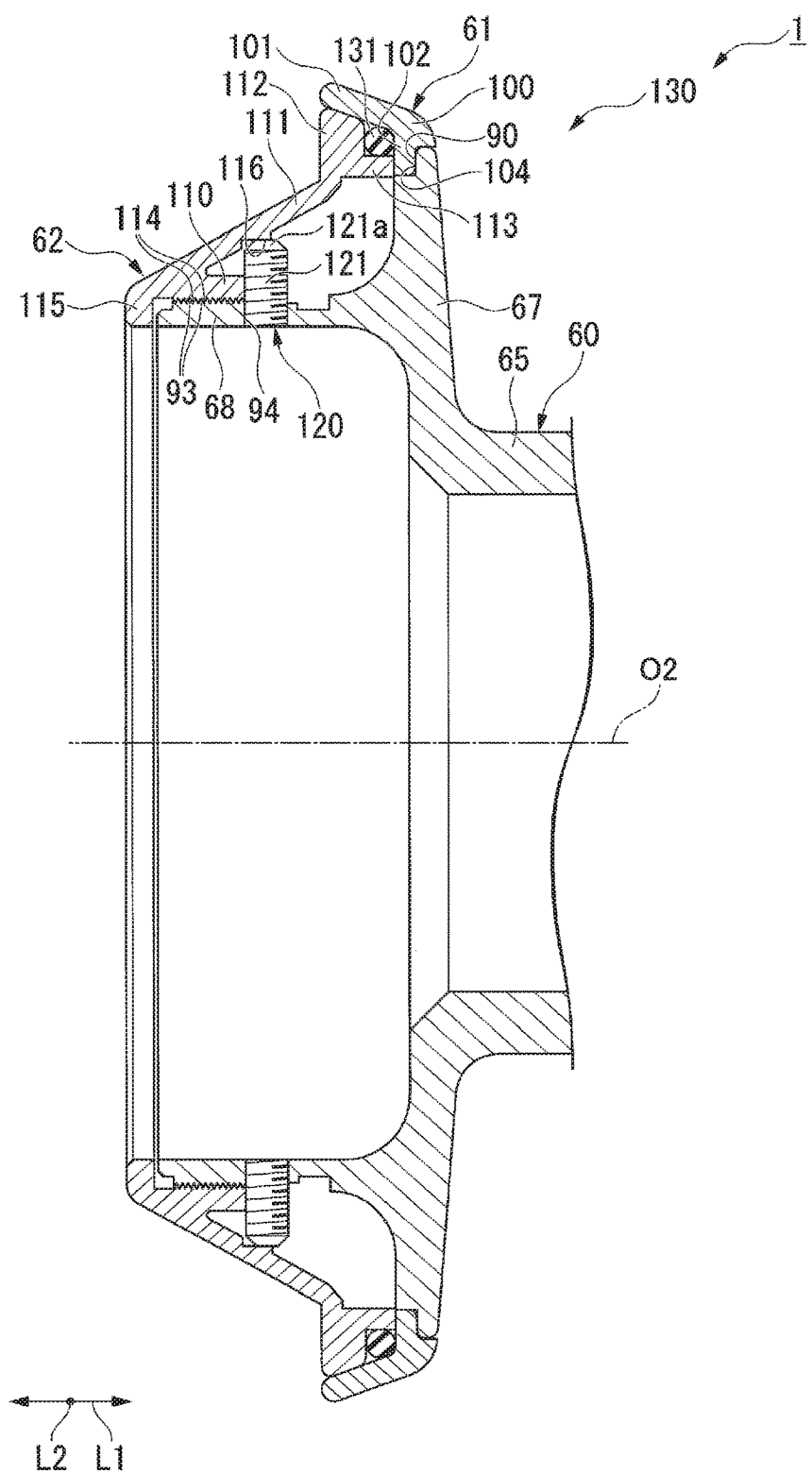
FIG. 13 is a cross-sectional view of the spool showing a second embodiment of the present invention and an enlarged cross-sectional view of the periphery of the spool ring.
Figure 14:
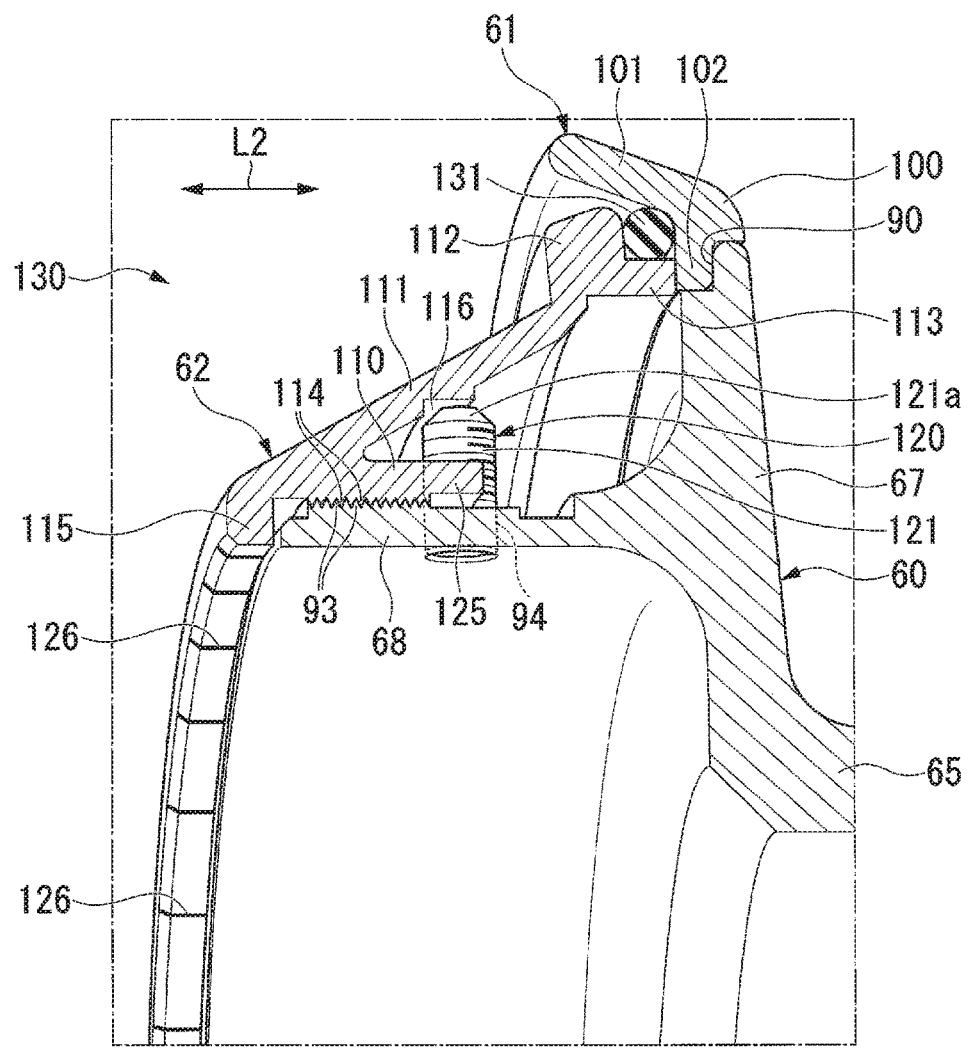
FIG. 14 is a perspective view (including a cross-sectional view) of the spool shown in FIG. 13.

As shown in FIGS. 13 and 14, the spinning reel 1 of the present embodiment comprises a spool 130 in which an O-ring (anti-rotation portion) 131 is disposed between the support wall portion 112 of the ring collar 62 and the ring body 100 of the spool ring 61, instead of the first recess 92, the second recess 104, and the anti-rotation pin 106 of the first embodiment.

The O-ring 131 surrounds the outer pressing piece 113 of the ring collar 62 from the outside in the radial direction and externally fits to the pressing piece 113.

The O-ring 131 can be formed from an elastic material such as nitrile rubber, fluororubber, and silicone rubber, and the diameter thereof larger than the space between the ring body 100 of the spool ring 61 and the support wall portion 112 of the ring collar 62 in the back-forth direction L2. Thus, the O-ring 131 is sandwiched between the ring body 100 of the spool ring 61 and the support wall portion 112 of the ring collar 62 in a state of elastic deformation so as to be crushed in the back-forth direction L2.

Thus, the O-ring 131 is in close contact with at least each of the ring body 100 of the spool ring 61 and the support wall portion 112 of the ring collar 62 due to the elastic restorative force. Thus, a tight seal is ensured between the O-ring 131 and the spool ring 61 as well as between the O-ring 131 and the ring collar 62.

Furthermore, the ring collar 62 presses the connecting piece 102 of the spool ring 61 against the flange 67 of the spool body 60 from the front via the pressing piece 113 and strongly presses the O-ring 131 against the spool ring 61 from the front. It is thus possible to ensure high sliding resistance between the O-ring 131 and the spool ring 61 and to effectively suppress the relative movement of the spool ring 61 with respect to the spool body 60 in the circumferential direction.

Even with the spinning reel 1 according to the present embodiment, formed as described above, since it is possible to suppress the relative movement of the spool ring 61 with respect to the spool body 60 in the circumferential direction by using the O-ring 131, the same action and effects as those of the first embodiment can be achieved.

In addition, because a tight seal can be ensured by using the O-ring 131, it is possible to effectively prevent dust, liquid, etc., from entering the ring collar 62 from the outside, for example, through the space between the ring collar 62 and the spool ring 61. Thus, the spool 130 and the spinning reel 1 equipped with, for example, excellent waterproof performance can be provided.

Furthermore, since it is not necessary to fit the anti-rotation pin 106 inside the first recess 92 and the second recess 104, as in the first embodiment, the spool ring 61 can be efficiently exchanged, replaced, etc.

Although embodiments of the present invention were described above, these embodiments have been presented only as examples and are not intended to limit the scope of the invention. The embodiments may be implemented in a variety of other forms; furthermore, various omissions, substitutions and changes may be made without departing from the essence of the invention. Embodiments and modifications thereto include those that can be easily conceived of by a person skilled in the art, those that are essentially the same, and those that are equivalent in scope.

For example, in each of the embodiments described above, the ring collar 62 is screwed onto the spool body 60, but no limitation is imposed thereby. For example, the ring collar 62 may be combined with or attached to the spool body 60 so as to be relatively movable in the direction of the spool axis O2 (back-forth direction L2). In any case, it suffices if the spool ring 61 can be separately combined with or attached to the spool body 60 from the front via the tubular connecting portion 68.

In addition, in each of the embodiments described above, the relative movement of the ring collar 62 with respect to the spool body 60 in the circumferential direction is regulated by use of the screw member 120 and the locking projection 125, but the locking projection 125 is not essential and need not be provided.

For example, a screw hole into which the distal end portion 121*a* of the screw member 120 is threaded may be formed on the stopper surface 116 of the ring collar 62, and the distal end portion 121*a* of the screw member 120 that is threaded into the screw hole 94 of the tubular connecting portion 68 may be further threaded into a screw hole formed on the stopper surface 116. Since it is thereby possible to connect the spool body 60 and the ring collar 62 in the radial direction by the screw member 120, it is possible to regulate the relative movement of the ring collar 62 with respect to the spool body 60 in the circumferential direction without using the locking projections 125.

Furthermore, when the distal end portion 121*a* of the screw member 120 is screwed into the screw hole formed on the stopper surface 116, it is possible to apply this modification to a configuration in which, for example, the ring collar 62 is combined with or attached to the spool body 60 from the front by means of a sliding movement.

For example, after the ring collar 62 is combined with or attached to the spool body 60 from the front by the sliding movement, the distal end portion 121*a* of the screw member 120 that is threaded into the screw hole 94 of the tubular connecting portion 68 can be also threaded into the screw hole formed on the stopper surface 116, to thereby regulate both the relative movement of the ring collar 62 with respect to the spool body 60 in the circumferential direction and the relative movement of the ring collar 62 with respect to the spool body 60 in the back-forth direction L2.

However, it is more preferable if the screw member 120 and the locking projection 125 are made to cooperate with each other, as in each of the embodiments described above, because it is a simple matter to more reliably regulate the relative movement of the ring collar 62 with respect to the spool body 60, compared with regulating the relative movement of the ring collar 62 with only the screw member 120.

In addition, in each of the embodiments described above, cases in which a set screw was used as the screw member 120 were described as examples, but the present invention is not limited to the set screw; an ordinary bolt, screw, etc., may be used, and the head portion may have a larger diameter than the screw shaft 121.

Furthermore, the present invention is not limited to the screw member 120; for example, a rod member such as a lock pin may be used as the first regulating part that regulates the relative movement of the ring collar 62 with respect to the spool body 60. In this embodiment, for example, a through-hole may be formed on the tubular connecting portion 68 instead of the screw hole 94, and the rod member may be fitted and attached inside this through-hole to thereby bring the rod member and the locking projection 125 into a state of being able to engage with each other in the circumferential direction. The same action and effects can be achieved in this case as well.

However, it is more preferable to use the screw member 120 as the first regulating part, because it is possible to effectively prevent the screw member 120 from unintentionally falling out of the screw hole 94.

Additionally, in the first embodiment described above, the anti-rotation portion 106 is fitted inside the first recess 92 and the second recess 104 to suppress the relative movement of the spool ring 61 with respect to the spool body 60 in the circumferential direction, but the relative movement of the spool ring 61 with respect to the spool body 60 in the circumferential direction may be suppressed by, for example, forming a protrusion that enters the first recess 92 or the second recess 104 on the spool body 60 or the spool ring 61.

For example, a protrusion that protrudes inwardly in the radial direction and that is fitted into the first recess 92 may be formed on the connecting piece 102 of the spool ring 61 instead of the second recess 104. Even in this embodiment, the protrusion can be fitted into the first recess 92 from the front with the combining of the spool ring 61 with the spool body 60, and it is possible to suppress the relative movement of the spool ring 61 with respect to the spool body 60 in the circumferential direction by using the fitting of the first recess 92 and the protrusion.

On the other hand, a protrusion that protrudes outwardly in the radial direction and that fits into the second recess 104 may be formed on the flange 67 of the spool body 60 instead of the first recess 92. Even in this embodiment, the protrusion can be fitted into the second recess 104 from the front with the combining of the spool ring 61 with the spool body 60, and the relative movement of the spool ring 61 with respect to the spool body 60 in the circumferential direction can be suppressed by using the fitting of the second recess 104 and the protrusion.

What is claimed is:

1. A spool for a fishing reel attached to a reel body of the fishing reel, which is capable of casting a fishing line forward, and moving back and forth along a spool axis together with a rotation of a handle that is attached to the reel body, comprising:
    a spool body having a bobbin trunk around which the fishing line is capable of being wound, an annular flange extending from a front end portion of the bobbin trunk in a radially outward direction that intersects the spool axis, and a tubular connecting portion extending forward from the annular flange;
a spool ring surrounding an outer peripheral edge of the flange from the radially outward direction, and attached to the flange so as to be separable from a front direction;
a fixing ring attached to the spool body via the tubular connecting portion so as to be separable from the front direction and configured to fix the spool ring against the flange from the front direction; and
a first regulating part configured to regulate relative movement of the fixing ring with respect to the spool body detachably attached to the tubular connecting portion by being inserted into the tubular connecting portion in a direction transverse to the spool axis.

2. The spool for a fishing reel according to claim 1, wherein
a second regulating part configured to regulate the relative movement of the fixing ring with respect to the spool body in cooperation with the first regulating part disposed on the fixing ring.

3. The spool for a fishing reel according to claim 2, wherein
the tubular connecting portion has a first threaded portion,
the fixing ring has a tubular threaded portion having a second threaded portion configured to screw together with the first threaded portion, and is attached to the spool body by screwing the tubular threaded portion onto the tubular connecting portion, and
the second regulating part is configured to engage the first regulating part from a circumferential direction about the spool axis to thereby regulate the movement of the fixing ring with respect to the spool body in the circumferential direction.

4. The spool for a fishing reel according to claim 3, wherein
the first regulating part is one of a plurality of first regulating parts and the second regulating part is one of a plurality of second regulating parts disposed at intervals in the circumferential direction.

5. The spool for a fishing reel according to claim 3, further comprising
a marker configured to indicate a relative circumferential position of the second regulating part with respect to the first regulating part disposed on the fixing ring.

6. The spool for a fishing reel according to claim 1, further comprising
an anti-rotation portion configured to suppress relative movement of the spool ring in a circumferential direction about the spool axis with respect to the flange.

7. A fishing reel, comprising:
a reel body having a handle;
the spool according to claim 1; and
a rotor attached to the reel body so as to be rotatable about the spool axis together with the rotation of the handle, and configured to wind the fishing line around the bobbin trunk by rotation in conjunction with the movement back and forth of the spool.

8. A spool for a fishing reel attached to a reel body of the fishing reel, which is capable of casting a fishing line forward, and moving back and forth along a spool axis together with a rotation of a handle that is attached to the reel body, comprising:
a spool body having a bobbin trunk around which the fishing line is capable of being wound, an annular flange extending from a front end portion of the bobbin trunk in a radially outward direction that intersects the spool axis, and a tubular connecting portion extending forward from the annular flange, the tubular connecting portion including a screw hole extending therethough in a radial direction;
a spool ring surrounding an outer peripheral edge of the flange from the radially outward direction, and attached to the flange so as to be separable from a front direction;
a fixing ring attached to the spool body via the tubular connecting portion so as to be separable from the front direction and configured to fix the spool ring, against the flange from the front direction; and
a first regulating part configured to regulate relative movement of the fixing ring with respect to the spool body detachably attached to the tubular connecting portion,
the first regulating part being a screw member capable of being threaded into the screw hole.

9. A spool for a fishing reel attached to a reel body of the fishing reel, which is capable of casting a fishing line forward, and moving back and forth along a spool axis together with a rotation of a handle that is attached to the reel body, comprising:
a spool body having a bobbin trunk around which the fishing line is capable of being wound, an annular flange extending from a front end portion of the bobbin mink in a radially outward direction that intersects the spool axis, and a tubular connecting portion extending forward from the annular flange;
a spool ring surrounding an outer peripheral edge of the flange from the radially outward direction, and attached to the flange so as to be separable from a front direction; a fixing ring attached to the spool body via the tubular connecting portion so as to be separable from the front direction and configured to fix the spool ring against the flange from the front direction;
a first regulating part configured to regulate relative movement of the fixing ring with respect to the spool body detachably attached to the tubular connecting portion; and an anti-rotation portion configured to suppress relative movement of the spool ring in a circumferential direction about the spool axis with respect to the flange,
the anti-rotation portion including a first recess disposed on the flange and opening forward and in the radially outward direction, a second recess opening toward the front direction and in a radially inward direction and disposed to face the first recess in a radial direction, and an anti-rotation pin configured to detachably fit inside the first recess and the second recess from the front direction.

10. The spool for a fishing reel according to claim 9, wherein
the fixing ring is configured to press the anti-rotation pin from the front direction.

* * * * *